United States Patent
Lee et al.

(10) Patent No.: US 9,491,591 B2
(45) Date of Patent: Nov. 8, 2016

(54) METHOD AND APPARATUS FOR RELIABLY TRANSMITTING GROUP MULTICAST USING A CELL BROADCASTING TECHNIQUE IN A MOBILE COMMUNICATION SYSTEM

(75) Inventors: Sung Won Lee, Yongin-si (KR); Han Na Lim, Seoul (KR); Beom Sik Bae, Suwon-si (KR); Song Yean Cho, Seoul (KR)

(73) Assignees: Samsung Electronics Co., Ltd., Suwon-si (KR); Kyung Hee University Industry Academic Cooperation Foundation, Yongin-si (KR)

( * ) Notice: Subject to any disclaimer, the term of this patent is extended or adjusted under 35 U.S.C. 154(b) by 473 days.

(21) Appl. No.: 13/992,477

(22) PCT Filed: Dec. 13, 2011

(86) PCT No.: PCT/KR2011/009574
§ 371 (c)(1),
(2), (4) Date: Jun. 7, 2013

(87) PCT Pub. No.: WO2012/081882
PCT Pub. Date: Jun. 21, 2012

(65) Prior Publication Data
US 2013/0250844 A1    Sep. 26, 2013

(30) Foreign Application Priority Data

Dec. 13, 2010    (KR) .................. 10-2010-0126966

(51) Int. Cl.
| | | |
|---|---|---|
| H04W 72/00 | (2009.01) |
| H04L 12/18 | (2006.01) |
| H04L 12/701 | (2013.01) |
| H04L 12/801 | (2013.01) |
| H04L 12/761 | (2013.01) |
| H04W 4/06 | (2009.01) |
| H04W 4/08 | (2009.01) |
| H04W 76/00 | (2009.01) |

(52) U.S. Cl.
CPC .............. *H04W 4/06* (2013.01); *H04L 12/189* (2013.01); *H04L 12/1863* (2013.01); *H04W 4/08* (2013.01); *H04W 72/005* (2013.01); *H04W 76/002* (2013.01)

(58) Field of Classification Search
CPC .. H04W 72/005; H04L 12/189; H04L 45/00; H04L 47/10; H04L 45/16; H04L 12/185
USPC ......................................... 370/312, 389, 390
See application file for complete search history.

(56) References Cited

U.S. PATENT DOCUMENTS

| | | | | |
|---|---|---|---|---|
| 6,594,758 B1 * | 7/2003 | Okui | ...................... | H04H 60/15 713/153 |
| 6,978,143 B1 | 12/2005 | Vialen | | |

(Continued)

FOREIGN PATENT DOCUMENTS

| | | |
|---|---|---|
| KR | 10-2005-0043235 A | 5/2005 |
| KR | 10-2006-0090134 A | 8/2006 |
| KR | 10-2007-0109700 A | 11/2007 |

*Primary Examiner* — Ronald B Abelson
(74) *Attorney, Agent, or Firm* — Jefferson IP Law, LLP

(57) ABSTRACT

The present invention relates to a method and apparatus for transmitting information to a terminal of a specific group using multicast transmission equipment in a mobile communication system. The method of the present invention comprises: an information receiving step of receiving, from an information provider, information to be transmitted to the terminal; a selection step of selecting either a cell broadcasting service multicast transmission scheme or a multimedia broadcast multicast service multicast transmission scheme in accordance with the size of the received information; and a multicast transmission step of multicast transmitting the information to the terminal of the specific group in accordance with the selected transmission scheme.

18 Claims, 53 Drawing Sheets

(56) References Cited

U.S. PATENT DOCUMENTS

| | | | |
|---|---|---|---|
| 7,864,722 B2* | 1/2011 | Yi | H04L 12/1886 370/312 |
| 2002/0094835 A1* | 7/2002 | Hayashi | H04W 52/12 455/522 |
| 2004/0071128 A1 | 4/2004 | Jang et al. | |
| 2004/0103435 A1 | 5/2004 | Yi et al. | |
| 2005/0078698 A1* | 4/2005 | Araya | H04L 12/1863 370/432 |
| 2006/0223544 A1* | 10/2006 | Lee et al. | 455/450 |
| 2008/0009320 A1 | 1/2008 | Rikkinen et al. | |
| 2011/0103288 A1* | 5/2011 | Lee | H04W 48/12 370/312 |

* cited by examiner

FIG. 3

Write-Replace Warning Request

| FIELDS | PRESENCE |
|---|---|
| Message Type | Mandatory |
| Message Identifier | Mandatory |
| Serial Number | Mandatory |
| List of TAIs | Optional |
| Warning Area List | Optional |
| Repetition Period | Mandatory |
| Number of Broadcast Requested | Mandatory |
| Warning Type | Optional |
| Warning Security Information | Optional |
| Data Coding Scheme | Optional |
| Warning Message Contents | Optional |
| OMC ID | Optional |
| Concurrent Warning Message Indicator | Optional |

FIG. 4

Write-Replace Warning Response

| FIELDS | PRESENCE |
|---|---|
| Message Type | Mandatory |
| Message Identifier | Mandatory |
| Serial Number | Mandatory |
| Cause | Mandatory |
| Criticality Diagnostics | Optional |

FIG. 5

Stop Warning Request

| FIELDS | PRESENCE |
|---|---|
| Message Type | Mandatory |
| Message Identifier | Mandatory |
| Serial Number | Mandatory |
| List of TAIs | Optional |
| Warning Area List | Optional |
| OMC ID | Optional |

FIG. 6

Stop Warning Response

| FIELDS | PRESENCE |
|---|---|
| Message Type | Mandatory |
| Message Identifier | Mandatory |
| Serial Number | Mandatory |
| Cause | Mandatory |
| Criticality Diagnostics | Optional |

FIG. 7

Warning Type

| VALUE | TYPE |
|---|---|
| 0000000 | Earthquake |
| 0000001 | Tsunami |
| 0000010 | Earthquake and Tsunami |
| 0000011 | Test |
| 0000100 | Other |
| 0000101-1111111 | Reserved for future use |

FIG. 8

Message identifier

| VALUE | TYPE |
|---|---|
| 0 - 999 | Reserved for GSMA |
| 1000 - 1003 | LCS CBS Assistance |
| 1004 - 4095 | Reserved for Future Standardization |
| 4096 - 4223 | Unsecure CBS Data Download to the SIM |
| 4224 - 4351 | Secure CBS Download to the SIM |
| 4352 - 6399 | ETWS/CMAS CBS Message |
| 6400 - 40959 | Reserved for Future Standardization |
| 40960 - 45055 | PLMN Operator Specific (Non-roaming) |
| 45056 - 65534 | Future PLMN Operator Specific |
| 65535 | Reserved (Should not be used) |

FIG. 10

Search List

| VALUE | TYPE |
|---|---|
| 1000 - 1003 | LCS CBS Assistance |
| 4096 - 4223 | Unsecure CBS Data Download to the SIM |
| 4224 - 4351 | Secure CBS Download to the SIM |
| 4352 - 6399 | ETWS/CMAS CBS Message |

FIG. 15

MULTICAST GROUP DATABASE

| GROUP IP ADDRESS | CBS GROUP ID | MBMS GROUP ID | UNICAST MSISDN LIST | UNICAST IP LIST |
|---|---|---|---|---|
| 163.180.000.001 | Group_C1 | Group_M1 | { X1, X2, X3, ··· } | { Y1, Y2, Y3, ··· } |
| 163.180.000.002 | Group_C2 | Group_M2 | { X1, X2, X3, ··· } | NONE |
| ··· | ··· | ··· | ··· | ··· |

FIG. 16

CBS GROUP DATABASE

| CBS GROUP ID | GROUP REGION | TRANSFER MODE | MEMBER UEs |
|---|---|---|---|
| Group_C1 | { R1, R2, R3, ... } | MODE_1 | { UE1, UE2, ... } |
| Group_C2 | { R1, R2, R3, ... } | MODE_2 | ⋮ |
| ⋮ | ⋮ | | ⋮ |

FIG. 17

TRANSFER MODE

| Transfer mode | Description |
|---|---|
| MODE_0 | Default |
| MODE_1 | Service Provider Subscribed Region |
| MODE_2 | UE Subscribed Region Only |
| MODE_3 | Reliable Transfer |
| MODE_4 | Highly Reliable Transfer |

FIG. 22

CBS Grouptransfer Request

| FIELDS | PRESENCE |
|---|---|
| Group ID | Mandatory |
| Sequence Number | Mandatory |
| Group Region | Mandatory |
| Transfer Mode | Optional |
| Contents | Optional |

FIG. 23

CBS Grouptransfer Response

| FIELDS | PRESENCE |
|---|---|
| Group ID | Mandatory |
| Sequence Number | Mandatory |
| Cause | Mandatory |

FIG. 24

Write-Replace Grouptransfer Request

| FIELDS | PRESENCE |
| --- | --- |
| Message Type | Mandatory |
| Message Identifier | Mandatory |
| Serial Number | Mandatory |
| List of TAIs | Optional |
| Grouptransfer Area List | Optional |
| Repetition Period | Mandatory |
| Number of Broadcast Requested | Mandatory |
| Grouptransfer Type | Optional |
| Grouptransfer Security Information | Optional |
| Data Coding Scheme | Optional |
| Grouptransfer Message Contents | Optional |
| OMC ID | Optional |
| Concurrent Message Indicator | Optional |

FIG. 25

Message Identifier

| VALUE | TYPE |
|---|---|
| 0 - 999 | Reserved for GSMA |
| 1000 - 1003 | LCS CBS Assistance |
| 1004 | Grouptransfer Message |
| 1005 - 4095 | Reserved for Future Standardization |
| 4096 - 4223 | Unsecure CBS Data Download to the SIM |
| 4224 - 4351 | Secure CBS Download to the SIM |
| 4352 - 6399 | ETWS/CMAS CBS Message |
| 6400 - 40959 | Reserved for Future Standardization |
| 40960 - 45055 | PLMN Operator Specific (Non-roaming) |
| 45056 - 65534 | Future PLMN Operator Specific |
| 65535 | Reserved (Should not be used) |

FIG. 26

Grouptransfer Type

| VALUE | TYPE |
|---|---|
| 0000000 | Reserved |
| 0000001 | Group_C1 |
| 0000010 | Group_C2 |
| 0000011-1111111 | Reserved for future use |

FIG. 27 searchList

| VALUE | TYPE |
|---|---|
| 1000 - 1003 | LCS CBS Assistance |
| 1004 | Grouptransfer Message |
| 4096 - 4223 | Unsecure CBS Data Download to the SIM |
| 4224 - 4351 | Secure CBS Download to the SIM |
| 4352 - 6399 | ETWS/CMAS CBS Message |

FIG. 28 searchList

| VALUE | TYPE |
|---|---|
| 0000001 | Group_C1 |

FIG. 35

Multicast Request

| FIELDS | PRESENCE |
|---|---|
| Group ID | Mandatory |
| Sequence Number | Mandatory |
| Group Region | Optional |
| Transfer Mode | Optional |
| Method Type | Optional |
| Method Parameters | Optional |

FIG. 36

Multicast Response

| FIELDS | PRESENCE |
| --- | --- |
| Group ID | Mandatory |
| Sequence Number | Mandatory |
| Cause | Mandatory |

FIG. 37

Write-Replace Grouptransfer Request

| FIELDS | PRESENCE |
|---|---|
| Message Type | Mandatory |
| Message Identifier | Mandatory |
| Serial Number | Mandatory |
| List of TAIs | Optional |
| Grouptransfer Area List | Optional |
| Repetition Period | Mandatory |
| Number of Broadcast Requested | Mandatory |
| Grouptransfer Type | Optional |
| Grouptransfer Security Information | Optional |
| Data Coding Scheme | Optional |
| Grouptransfer Message Contents | Optional |
| OMC ID | Optional |
| Concurrent Message Indicator | Optional |

FIG. 38

Message Identifier

| VALUE | TYPE |
|---|---|
| 0 - 999 | Reserved for GSMA |
| 1000 - 1003 | LCS CBS Assistance |
| 1004 - 4095 | Reserved for Future Standardization |
| 4096 - 4223 | Unsecure CBS Data Download to the SIM |
| 4224 - 4351 | Secure CBS Download to the SIM |
| 4352 - 6399 | ETWS/CMAS CBS Message |
| 6400 - 40959 | Reserved for Future Standardization |
| 40960 | Group_C2 |
| 40961 - 45055 | Reserved for Future Group Allocation |
| 45056 - 65534 | Future PLMN Operator Specific |
| 65535 | Reserved (Should not be used) |

FIG. 39

Grouptransfer Type

| VALUE | TYPE |
|---|---|
| 0000000 | Reserved |
| 0000001 | Dynamic Programming |
| 0000010 | Bill Report Request |
| 0000011 | Status Report Request |
| 0000100 | Firmware Fusing |
| 0000101-1111111 | Reserved for Future Methods |

FIG. 41

CBS Grouptransfer Request

| FIELDS | PRESENCE |
| --- | --- |
| Group ID | Mandatory |
| Sequence Number | Mandatory |
| Group Region | Mandatory |
| Transfer Mode | Optional |
| Method Type | Optional |
| Method Parameters | Optional |

FIG. 42

CBS Grouptransfer Response

| FIELDS | PRESENCE |
| --- | --- |
| Group ID | Mandatory |
| Sequence Number | Mandatory |
| Cause | Mandatory |

FIG. 43 emergencyList

| VALUE | TYPE |
|---|---|
| 1000 - 1003 | LCS CBS Assistance |
| 4096 - 4223 | Unsecure CBS Data Download to the SIM |
| 4224 - 4351 | Secure CBS Download to the SIM |
| 4352 - 6399 | ETWS/CMAS CBS Message |

FIG. 44 groupList

| VALUE | TYPE |
|---|---|
| 1004 | Group_C1 |
| 1005 | Group_C2 |

FIG. 45

Grouptransfer Type

| VALUE | TYPE |
|---|---|
| 0000001 | Dynamic Programming |
| 0000010 | Bill Report Request |
| 0000011 | Status Report Request |
| 0000100 | Firmware Fusing |

FIG. 50

| UE ID | UE IP address | IP report status |
|---|---|---|
| MSISDN #1 | 163.180.000.000 | { YES, Multicaster IP#1 } |
| MSISDN #2 | None | { NO, None } |

FIG. 52

| UE Identifier | UE IP Address | UE Reliability Status | IP Report Condition | UE Target Reliability (optional) |
|---|---|---|---|---|
| MSISDN #1 | 163.180.000.000 | Ciritical | { YES, Multicaster IP#1 } | 5% |
| MSISDN #2 | { None } | { None } | { NO, None } | { None } |

METHOD AND APPARATUS FOR RELIABLY TRANSMITTING GROUP MULTICAST USING A CELL BROADCASTING TECHNIQUE IN A MOBILE COMMUNICATION SYSTEM

BACKGROUND OF THE INVENTION

1. Field of the Invention

The present invention relates to a mobile communication system and, in particular, to a reliable group multicast transmission method and apparatus using a cell broadcasting technique in the mobile communication system.

2. Description of the Related Art

Mobile communication systems developed to provide the subscribers with voice communication services on the move. With the rapid advance of technologies, the mobile communication systems have evolved to support high speed data communication services as well as the standard voice communication services. However, the resource shortage and user requirement for higher speed data services spurs the evolution of the mobile communication system to more advanced system.

Meanwhile, there are a few methods for transmitting the same information to plural terminal users such as Cell Broadcast Service (CBS) and Multimedia Broadcast and Multicast Service (MBMS). The CBS is a technology of transmitting the same information to all terminals within a particular region or whole mobile communication network. The information transmitted through CBS includes emergency information for the natural disaster warning. The MBMS is a technology of transmitting the same information within a particular group.

However, the conventional CBS has a drawback in that the broadcast signal cannot be addressed to a specific group and its transmission reliability is not guaranteed. For example, the packet communication terminal may not receive the information transmitted through CBS.

Meanwhile, the MBMS is a packet-based technology capable of multicasting information to a particular group, the MBMS scheduling information is transmitted in unicast message such as SMS, resulting in low utilization efficiency.

There is therefore a need of a multicast method capable of transmitting specific information to a particular group while guaranteeing transmission reliability in radio communication system.

DISCLOSURE OF INVENTION

Technical Problem

The present invention has been made in an effort to solve the above problems and it is an object of the present invention to provide a mobile communication system supporting CBS-based multicast guaranteeing reliability.

It is another object of the present invention to provide a novel CBS-based multicast technology. It is another object of the present invention to provide a multicast method that is capable of guaranteeing reliability of group transmission, whereby the information provider trusting the mobile carrier to deliver certain information. It is still another object of the present invention to provide a multicast method that is capable of improving radio resource utilization efficiency, resulting in advantage even to the mobile carrier.

Solution to Problem

In order to solve the above problem, a method for a multicast equipment to transmit information to a group of terminals in a mobile communication system includes receiving the information to be transmitted to the terminals from an information provider; selecting one of Cell Broadcast Service (CBS) multicast mode and Multimedia Broadcast Multicast Service (MBMS) multicast mode depending on a size of the received information; and multicasting the information to the group of terminals in the selected multicast mode.

Also, a multicast apparatus for transmitting information to a group of terminals in a mobile communication system includes an interface unit which receives the information to be transmitted to the terminals from an information provider; a group database which stores databases necessary for transmitting the information to the group of terminals; and a multicast processor which selects one of Cell Broadcast Service (CBS) multicast mode and Multimedia Broadcast Multicast Service (MBMS) multicast mode depending on a size of the received information and multicasts the information to the group of terminals in the selected multicast mode.

Advantageous Effects

According to the present invention, the information provider transmits information to an Internet address representing a corresponding group, and a multicast equipment selects a radio transmission scheme appropriate for the information transmission depending on the size of the corresponding information.

Thus it is possible to use the limited radio resource efficiently. Also, the multicast equipment of the present invention further perform unicast transmission to the terminals that were in telephone mode in the multicast session or under management based on a separate list after in subsequence to the multicast transmission.

BRIEF DESCRIPTION OF THE DRAWINGS

FIGS. 3 to 6 are diagram illustrating informations included in respective message depicted in FIG. 2.

FIG. 7 is a diagram illustrating warning types.

FIG. 8 is a diagram illustrating identifiers.

FIG. 10 is a diagram illustrating search list of the present invention.

FIG. 15 is a diagram illustrating exemplary multicast group database stored in the group database 1320 of the multicast equipment 1220.

FIG. 16 is a diagram illustrating a structure of the CBS group database.

FIG. 17 is a diagram illustrating transfer modes for multicast transmission through CBS according to an embodiment of the present invention.

FIGS. 22 to 28 are diagrams illustrating formats of the message used in the flowchart of FIG. 20.

FIG. 35 is a diagram illustrating the format of multicast request message transmitted from the information provider 1210 to the multicast equipment 3410 in FIG. 34.

FIG. 36 is a diagram illustrating the format of the multicast response message depicted in FIG. 34.

FIG. 37 is a diagram illustrating the format of the Write-Replace Grouptransfer request message according to another embodiment of the present invention.

FIG. 38 is a diagram illustrating the structure of the message identifier modified according to another embodiment of the present invention.

FIG. 39 is a diagram illustrating the group transfer type modified according to another embodiment of the present invention.

FIGS. 41 and 42 are diagrams illustrating the formats of CBS Grouptransfer Request/Response message.

FIG. 43 is a diagram illustrating the emergency list format of the present invention.

FIG. 44 is a diagram illustrating the group list format of the present invention.

FIG. 45 is a diagram illustrating the format of the group transfer method list.

FIG. 50 is a diagram illustrating the structure of the new database stored in HSS for registering the UE requiring unicast transmission according to the request of the information provider 1210.

FIG. 52 is a diagram illustrating the structure of the new database stored in HSS for UE IP tracking and reliability information management.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In an embodiment of the present invention, the description is directed to the enhancing transmission efficiency in case of transmitting small amount of information to terminals within a particular group using a multicast-enabled Cell Broadcast Service as enhanced CBS transmission technology. Also, a description is made of the method for enhancing the transmission reliability by modifying the conventional Cell Broadcast Service transmission technology.

Figure 1:
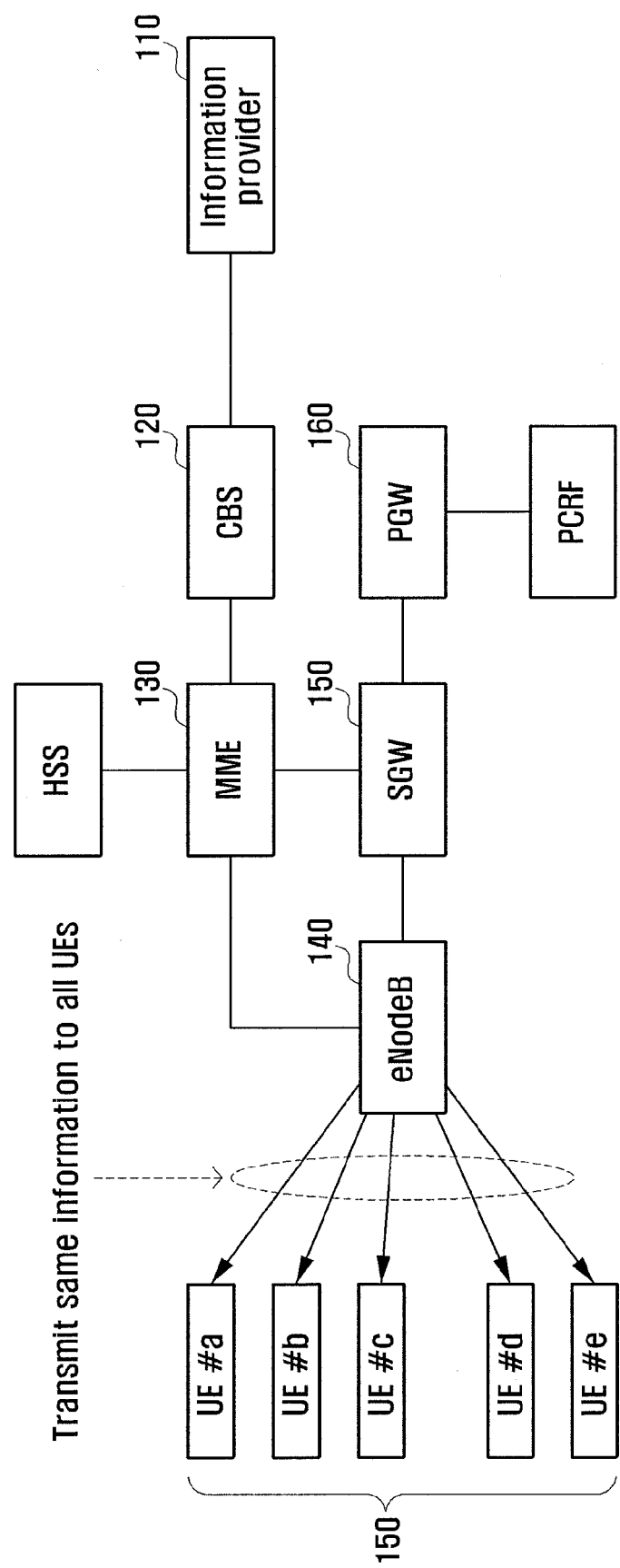
FIG. 1 is a block diagram illustrating a network structure for the conventional Cell Broadcasting Service (CBS).

FIG. 1 is a block diagram illustrating a network structure for the conventional Cell Broadcasting Service (CBS).

The conventional CBS is a technology of transmitting the same information to the mobile communication terminals within a particular area or whole mobile communication network and, in this case, the information includes emergency information on natural disaster.

The information provider 110 provides the CBS Center (CBC) 120 with the information to be transmitted. Then the CBC 120 pages the terminals 150 via the Mobility Management Entity (MME) 130 and evolved Node B (eNB) 140 to transmit the information.

Figure 2:
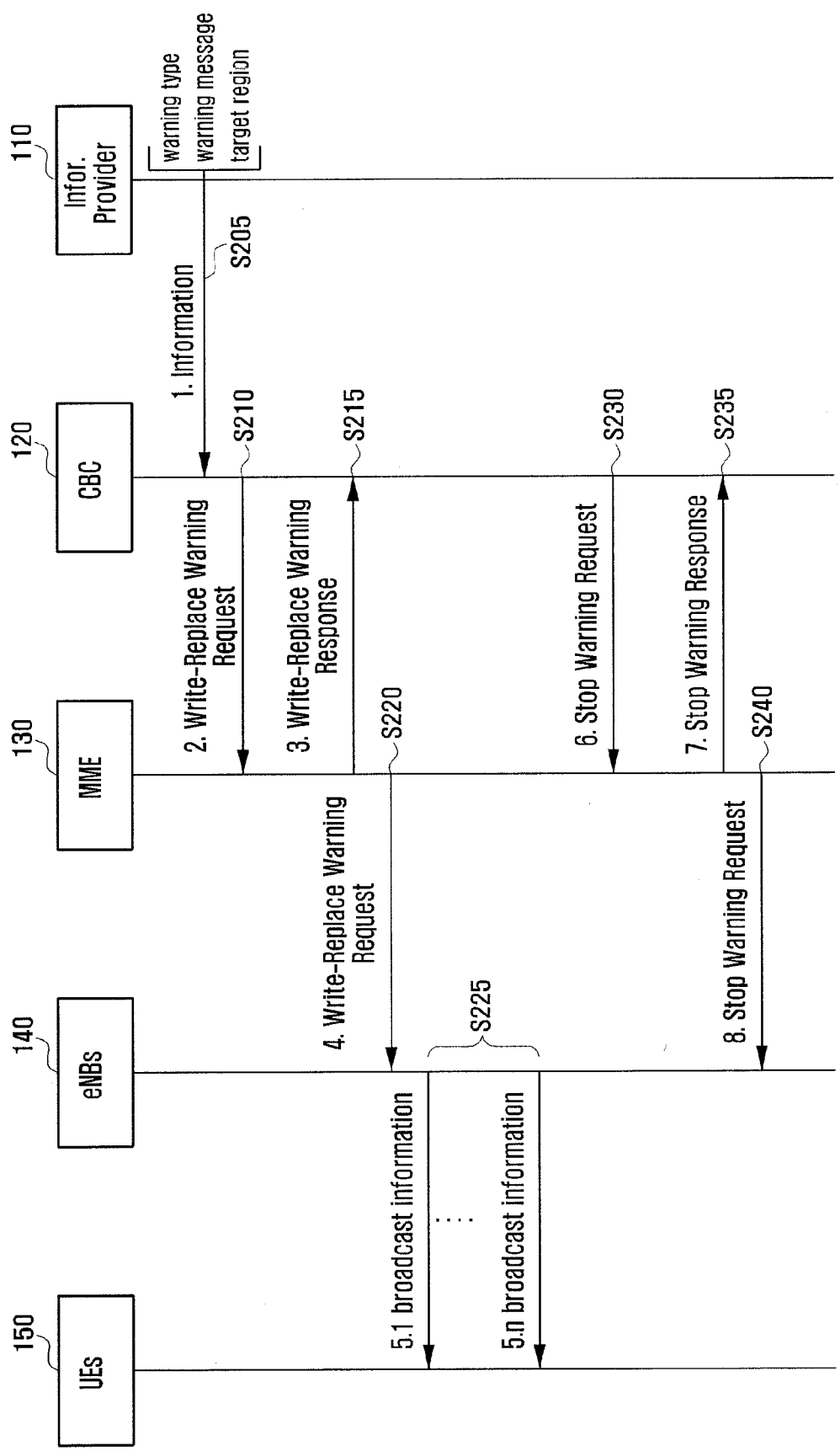
FIG. 2 is a signal flow diagram illustrating CBS transmission procedure of a convention technology.

FIG. 2 shows detailed procedure of exchanging information among the components in the network structure of FIG. 1. FIGS. 3 to 6 show the informations carried in respective messages appearing in FIG. 2.

First, information provider 110 provides the CBS information including emergency type, emergency message, target area, etc. at step S205. For example, the CBS information may be the natural disaster and emergency-related information. Upon receipt of the CBS information, the CBC 120 sends the MME 130 a Write-Replace Warning Request message at step S210. The message format of the Write-Replace Warning Request message is shown depicted in FIG. 3.

As shown in FIG. 3, the Write-Replace Warning Request message may include a message type indicating that the message carries the emergency information broadcast through CBS, a message identifier indicating that the contained information may not be supported depending on the mobile communication terminal, a Serial Number for testing redundancy of the corresponding message, a list of TAIs as the information on the broadcast are of the corresponding message and Warning Area List, a Repetition Period for leading to high successful reception probability of mobile communication terminal with repetitive broadcast of the message and number of Broadcast Requested, an emergency type (Warning Type) indicating the type of the emergency situation, Warning Security Information guaranteeing validity of the corresponding information, emergency message content (Warning Message Contents) about detailed information and Data Coding Scheme applied to the content, and OMC ID and Concurrent Warning Message Indicator as other management information.

The message identifier may be configured as shown in FIG. 8 in compliance with a standard. This may be the information for use in determining whether to take an action or discard the corresponding message. FIG. 7 shows a list of the emergency types (warning types) indicating the emergency and warning situations.

Returning to FIG. 2, the MME 130 sends a Write-Warning Response message to the CBS 120 in response to the Write-Replace Warning Request at step S215. The detailed format of the Write-Warning Response message is shown in FIG. 4. The Write-Warning Response message is a shortened format of the Write-Replace Warning Request and includes a Cause field containing information on the transmission success or transmission failure and a Criticality Diagnostics field containing supplementary information.

Upon receipt of the Write-Replace Warning Request message from the CBC 120, the MME 130 forwards the Write-Replace Warning Request message to the eNB 140 at step S220. Then the eNB 140 sends the UEs 150 the broadcast information provided by the information provider 110.

The CBC 120 may transmit the radio broadcast information repeatedly for a short or long duration. In the latter case, there is a need of suspending information transmission according to the network's necessity. For this purpose, the CBC 120 sends the MME 130 a Stop Warning Request message of which format is depicted in detail in FIG. 5 at step S230. Most of the fields of the Warning Stop Request message of FIG. 5 are identical with the fields in FIG. 3.

In response to the Stop Warning Request message, the MME 130 sends the CBC 120 a Stop Warning Response message at step S235 and forwards the Warning Stop Request message to the eNB 140 at step S240. The Stop Warning Response message format is depicted in detail in FIG. 6. The Stop Warning Request message is identical with the message of FIG. 4 with the exception of the message name.

Figure 9:
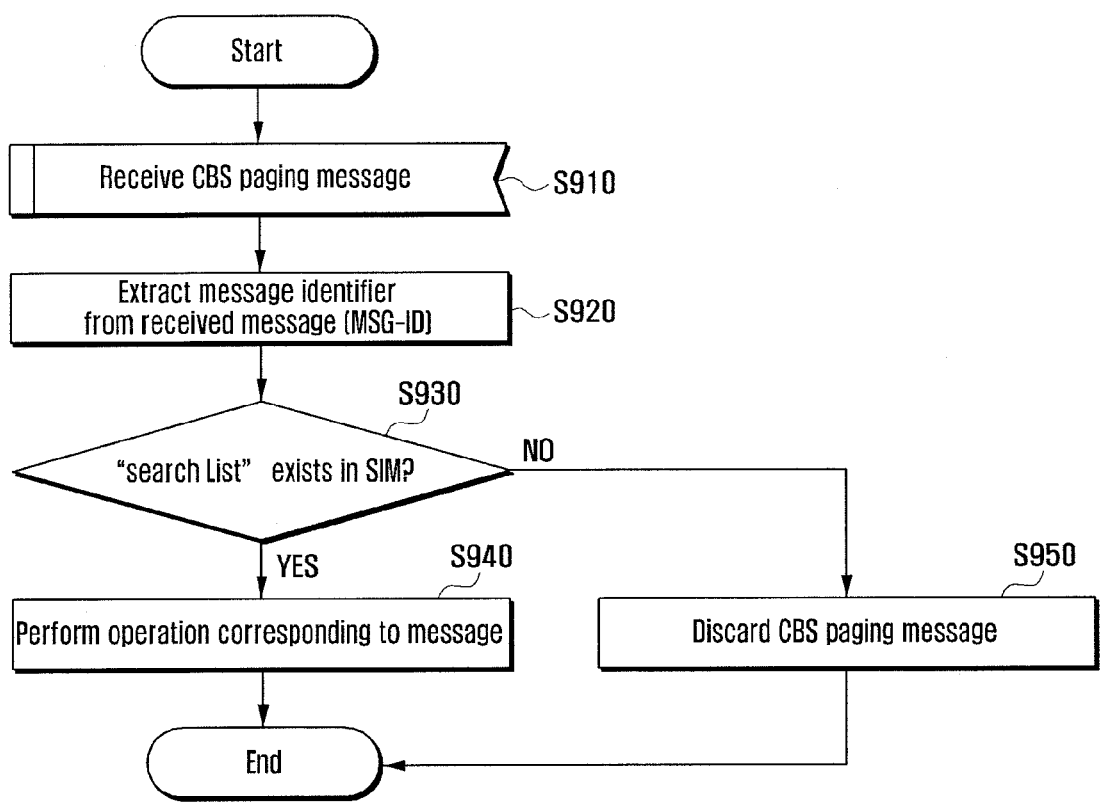
FIG. 9 is a flowchart illustrating the operation procedure of a conventional terminal received a broadcast message through cell broadcasting service.

FIG. 9 is a flowchart illustrating the operation procedure of a conventional UE received a broadcast message through CBS.

As shown in FIG. 9, the UE receives a broadcast message in the form of a paging message through CBS at step S910. Next, the UE extracts a message identifier from the received message at step S920. Next, the UE determines whether the extracted message identifier exists in a search list stored in its U(SIM) card, i.e. whether the message is interpretable by the UE, at step S930.

If the message identifier exists, the UE performs operation appropriate for the corresponding message at step S940. For example, the UE may display the emergency message. Otherwise, if the message identifier does not exist, the UE discards the corresponding message at step S950.

An exemplary search list is depicted in FIG. 10. The search list can be contained in the U(SIM) by the provider in subscription stage or provided by a remote server to the corresponding UE through Remote Fusing.

Figure 11:
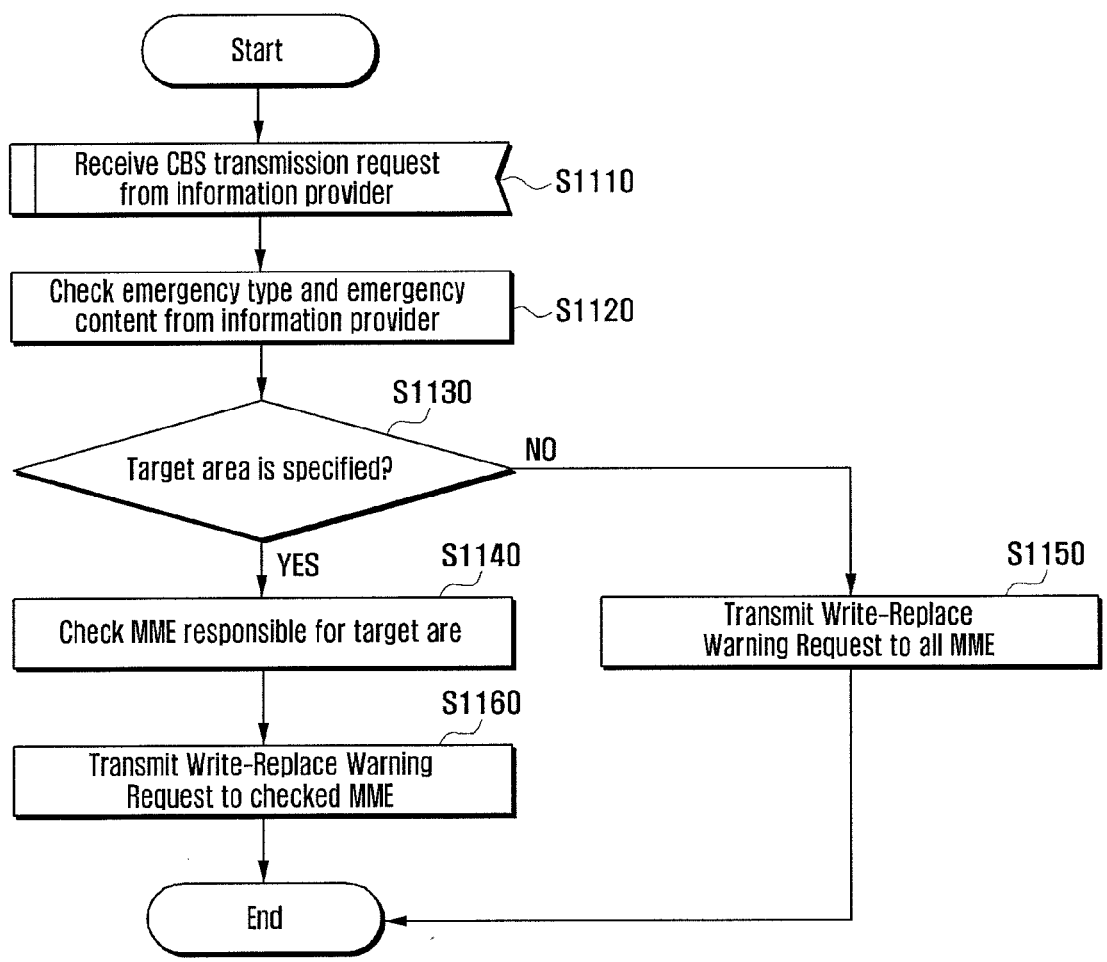
FIG. 11 is a flowchart illustrating the operation procedure of CBC received a request from the information provider.

Although the UE operation has been described first, the operation procedure of the CBC 120 which has received the request from the information provider 110 is depicted in FIG. 11.

First, the CBC 120 receives a CBS transmission request from the information provider at step S1110. Then the CBC 120 checks the emergency type and emergency detail included in the CBS transmission request at step S1120. Next, the CBC 120 determines whether the target area is specified, i.e. whether to transmit to a particular area or entire area, at step S1130. If a target area is specified, the CBC 120 searches for the MME covering the target area at step S1140. Next, the CBC 120 sends a Write-Replace Warning Request message to the found MME at step S1160.

Otherwise if a target area is not specified, i.e. if the information is transmitted to the entire area, the CBC 120 sends a Write-Replace Warning Request message to all MMEs at step S1150.

Hereinabove, the convention CBS procedure and message formats for use therein. However, if it is intended to transmit a message to multiple groups simultaneously through the convention CBS procedure, this may cause following problems.

First, the conventional circuit-switched technology cannot support multicast transmission. The CBS does not support transmission to specific group, and the Short Message Service (SMS)/Multimedia Message Service (MMS) supports only unicast transmission, it is impossible to transmit the same information to a particular group.

Meanwhile, the conventional packet-switched technology supports multicast transmission to a particular group through Multimedia Broadcast Multicast Service (MBMS). However, the use of unicast transmission such as SMS for notifying of the multicast time and multicast group degrades the utilization efficiency and requires for all UEs to have Internet Protocol (IP) connections. This may cause system load of procedure control and information management. Particularly in the case of small amount information transmission, the processing load for the aforementioned operation increases on the wired and wireless channels.

Also, the conventional CBS technology does not guarantee reliability. For example, the CBS-based transmission may not be received by the terminal operating in packet transmission mode.

The present invention has been conceived to solve the above problems and proposes a novel technique capable of multicast transmission per group based on the CBS technology. The technique proposed in the present invention guarantees transmission reliability and thus makes it possible for the information provider to trust the mobile carrier to deliver certain information. Furthermore, the mobile carrier is capable of using the radio resource economically and efficiently.

For this purpose, the present invention adopts new equipment called multicast equipment. In the case that an information provider wants to transmit the same information to plural groups, the multicast equipment provides an optimal transmission scheme based on the information size, multicast area, and information transmission reliability. Accordingly, it is possible to perform reliable multicast transmission using the radio resource of the mobile communication network efficiently.

Figure 12:
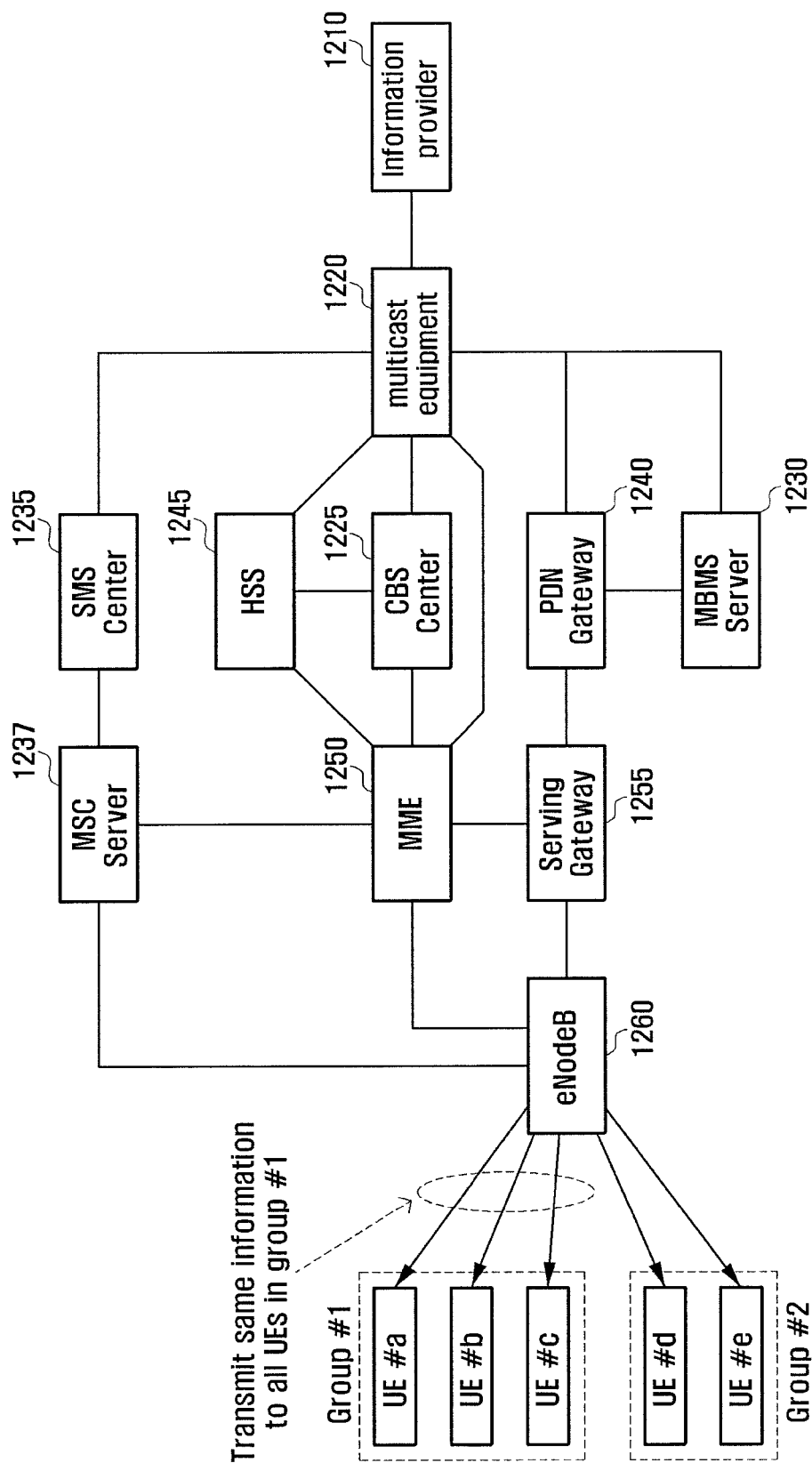
FIG. 12 is a diagram illustrating the structure of a mobile communication network according to an embodiment of the present invention.

FIG. 12 is a diagram illustrating the structure of the mobile communication network according to an embodiment of the present invention.

In an embodiment of the present invention, if multiple UEs are located in the coverage area of the same eNB, it is possible to perform economic and reliable multicast transmission by applying CBS multicast/MBMS multicast/SMS unicast/IP unicast transmission schemes selectively.

First, the information provider 1210 is a component requesting for multicast transmission of certain information. The information which the information provider 1210 wants to send may be natural disaster and emergency message but not limited thereto. This information may include emergency type, warning message, target area, etc.

The multicast equipment 1220 is positioned between the mobile communication network and the information provider 1210 to deliver the information requested by the information provider 1210 to the UEs in plural groups. The multicast equipment 1220 according to an embodiment of the present invention is assumed as the equipment transparent to the information provider 1210, which recognize the links of the switch and router connecting the mobile carrier network and the information provider network are interfacing the multicast equipment 1220 directly.

The multicast equipment 1220 according to an embodiment of the present invention performs CBS multicast and MBMS multicast selectively depending on the size of the information requested by the information provider for transmission. Simultaneously, the multicast equipment 1220 unicasts the corresponding information to the UEs for which unicast is required or the UEs in connected state (telephony mode).

Unlike the conventional network structure, the multicast equipment 1220 may be provided with an interface to interoperate with the HSS 1245 and MME 1250 for monitoring to unicast IP address of UE, whether the UE is registered, and whether the UE is active/idle state, for reliable transmission.

If a CBS multicast request is received from the multicast equipment 1220, the CBC 1225 controls the procedure of transmitting the corresponding information through CBS.

If a MBMS multicast request is received from the multicast equipment, the MBMS server 1230 controls the procedure of transmitting the corresponding information through MBMS.

If a SMS unicast request is received from the multicast equipment 1220 for transmission of information to a specific UE, the SMS Center 1235 controls the procedure of transmitting the corresponding information through MSC-Server 1237.

If an IP message transmission request is received from the multicast equipment 1220 for transmission of information to a specific UE, the PDN gateway 1240 controls the procedure of transmitting the corresponding message through IP network.

The MME 1250 manages the UEs in idle mode and selects Packet Data Network (PDN) gateway and serving gateway. The MME is also responsible for roaming and authentication management functions. According to an embodiment of the present invention, the MME 1250 may be provided with a connection interface with the multicast equipment 1220 for monitoring unicast IP address of UE, whether the UE is registered, and whether the UE is active/idle state, for reliable transmission.

The Serving Gateway 1255 works as a mobility anchor in handover of the UE between eNBs or between 3GPP radio networks.

The eNB 1260 is connected with the UE through a radio channel and controls radio resource. For example, the eNB 1260 generates and broadcasts the control information for use in the macro cell as system information and allocates radio resource for communicating data and control information with the UE.

Figure 13:
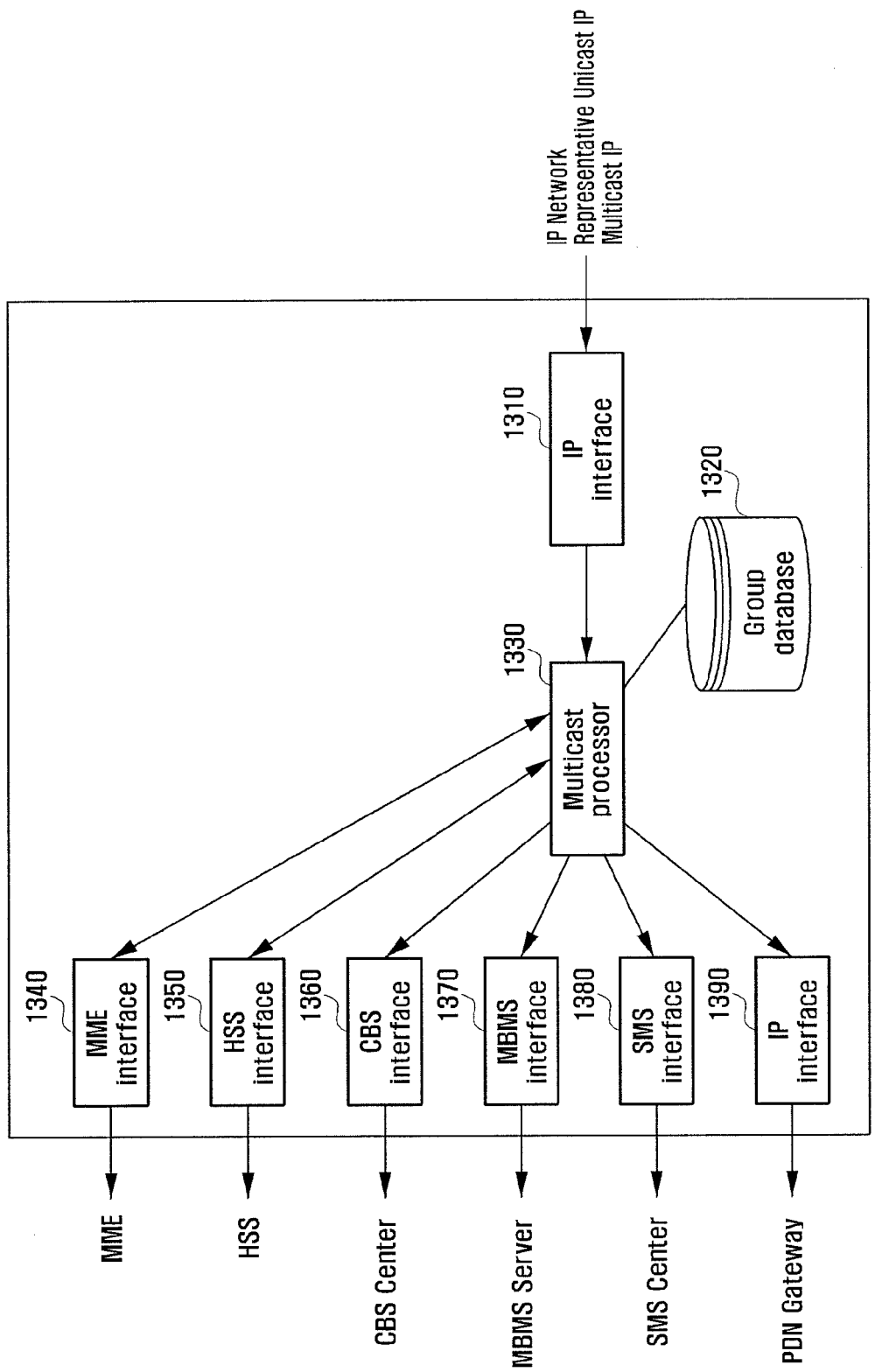
FIG. 13 is a block diagram illustrating the configuration of the multicast equipment 1220 according to an embodiment of the present invention.

FIG. 13 is a block diagram illustrating the configuration of the multicast equipment 1220 according to an embodiment of the present invention.

As shown in FIG. 13, the multicast equipment 1220 according to an embodiment of the present invention may include interfaces 1310, 1340, 1350, 1360, 1370, 1380, and 1390 for exchanging data and control information with external components, a group data base 1320 for storing information to be transmitted, and a multicast processor 1330 for controlling signal flows among the blocks.

First, the IP interface 1310 receives IP packets transmitted by the information provider 1210. The IP packet may include a unicast IP address or a multicast IP address. Although the unicast IP address has a format for unicast, the multicast equipment 1220 sends the information to the UEs mapped to the unicast IP in a multicast manner. Detailed description thereon is made later. The detailed procedure that the information provider 1210 is allocated the IP address is described with reference to FIG. 14.

The group database 1320 stores the information on the information delivery area requested by the multicast equipment 1220 and requirements for reliable information transmission. The detailed description of the information stored in the group database 1320 is made later.

The multicast processor 1330 controls overall operations of the multicast equipment 1220. That is, the multicast processor 1330 performs CBS multicast and MBMS multicast selectively depending on the amount of the transmission-requested information. Simultaneously, the multicast processor 1330 performs unicast of the corresponding information to the UEs requiring unicast transmission or in the connected state in the multicast session.

The interface blocks 1340 to 1390 provide the respective components with connection interfaces.

The MME interface 1340 and the HSS interface 1350 provide connection interfaces between the multicast equipment 1220 and the respective MME 1250 and the HSS 245 and are sued to monitor to detect unicast IP address for UE, UE registration, and active or idle state of the UE.

When an information transmission request is received from the information provider 1210, the multicast processor determines the information transmission scheme based on the size of the information to be transmitted and selects one of the interfaces 1360, 1370, 1380, and 1390 for data transmission.

In more detail, the multicast processor selects one of the CBS multicast and MBMS multicast based on the size of the information received from the information provider 1210. In this case, the multicast processor 1330 selects the CBS multicast for the information of which volume is equal to or smaller than a predetermined threshold or the MBMS multicast for the information of which volume is greater than the threshold.

After multicasting the information, the multicast processor 1330 determines where there is a UE requiring retransmission and, if so, controls to unicast the information to the UE as the retransmission target.

In the case that the MBMS multicast is selected as the transmission scheme, the multicast processor 1330 negotiates with the MBMS server on the scheduling information for the MBMS multicast of the information and sends the UEs belonging to a particular group the negotiated scheduling information through CBS multicast and controls MBMS multicast of the information to the UEs of the particular group at the transmission timings indicated in the scheduling information.

Figure 14:
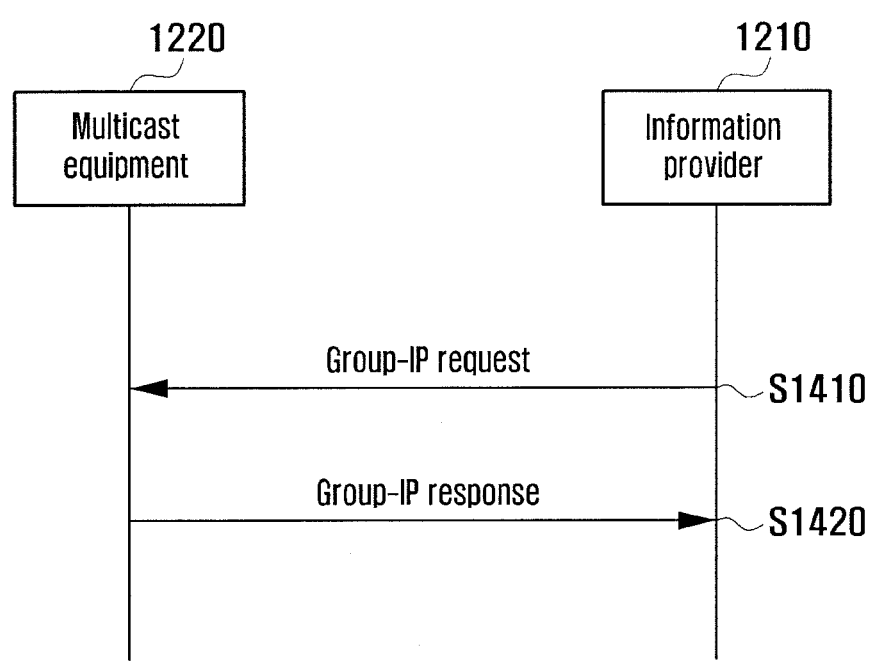
FIG. 14 is a signal flow diagram illustrating the procedure of allocating IP address to the information provider.

FIG. 14 is a signal flow diagram illustrating the procedure of allocating an IP address to the information provider 1210 for the multicast transmission to a UE group. The information provider 1210 requests for per-group information transmission using the IP address allocated through the procedure of FIG. 14.

The information provider 1210 first sends the multicast equipment 1220 a group-IP address request for an IP address for multicast transmission at step S1410.

Then the multicast equipment 1220 sends the information provider 1210 a group-IP response to allocate an appropriate unicast or multicast IP address to the information provider 1210 at step 1420.

FIG. 15 is a diagram illustrating an exemplary multicast group database stored in the group database 1320 of the multicast equipment 1220.

As shown in FIG. 15, the multicast group database of the present invention may include group IP address which the multicast equipment 1220 has allocated to the information provider (unicast IP address or multicast IP address), CBS group ID for identifying CBS group when the multicast transmission is performed through CBS, MBMS group ID for identifying the MBMS group when the multicast transmission is performed through MBMS, and UE identifier for unicast transmission in separation from the multicast transmission (Mobile Subscriber Integrated Service Digital Network Number (MSISDN) or IP address information).

Here, the group IP address is the term defined in logical concept and may be shown, to the information provider, as a unicast IP address identifying a particular UE. In this case, the multicast equipment 1220 maps the corresponding IP address to plural UEs internally. That is, the information provider 1210 transmits the message to the unicast IP address as recipient as if transmitting to unicast equipment, and the multicast equipment broadcasts or multicasts the message received with the unicast IP address to the internally-predetermined CBS group and MBMS group.

In order to make in possible to transmit the information such as unicast MSISDN to the UEs within the group, it should be assumed that the information on "Group IP Address: identifier of the UEs belonging to the group (e.g. MSISDN)" indicating UEs mapped to the unicast IP allocated to the information provider 1210 is set in the initial configuration according to the negotiation with the information provider. The group IP address may be allocated in the form of multicast IP address and, even in this case, the multicast equipment 1220 operates identically as described above.

Meanwhile, the mobile communication may configure a list of the UEs requiring unicast transmission in separation from the multicast transmission automatically. For example, for the UE of which mobile communication reception signal strength falls below a predetermined level frequently, the mobile communication network may add the corresponding UE as the unicast transmission target based on the report from the corresponding UE. The mobile communication network also may measure the response to the unicast or multicast transmission periodically and add the UE for which the number of receipt failures of response is equal to or less than a predetermined value as the unicast transmission target.

The reason for building a list of the UEs requiring unicast transmission is to guarantee the information transmission reliability by performing the unicast transmission to the UEs having the high reception failure probability in CBS or MBMS multicast.

A description is made of the procedure for registering the IP address of the UE requiring unicast transmission hereinafter in detail with reference to FIG. 15.

For the UE's IP address registration procedure, it is assumed that the UE as a target of multicast which is performing IP-based communication registers its IP address with the HSS when the IP address is allocated or withdrawn.

As a method for registering UE's IP address with HSS, it can be considered to use the conventional interface or a newly defined interface.

In the case of using the legacy interface, the IP session configuration procedure through legacy eNB/S-GW/P-GW can be configure such that the IP address allocated to (or released from) the corresponding UE is transmitted to the HSS via S-GW. In the case of using the newly defined interface, an new interface connecting the P-GW to the HSS directly is defined such that when a new IP is configured (or legacy IP release) through the newly defined interface the UE's IP address is transmitted to the HSS (along with UE identifier such as MSISND).

Under the assumption that the HSS retains the IP address of the UE through the above-described procedure, a description is made of the procedure of registering IP address of the UE requiring unicast transmission with reference to FIG. 15. In this case, the IP address registration procedure may be classified into one of a registration procedure according to the request of the information provider 1210 and a mobile communication network's auto-registration procedure.

The first is the registration in response to the request of the information provider 1210.

In separation from the multicast information transmission proposed in the present invention, it may be assumed that the information provider 1210 acquires the state information of UEs and per-UE statistics information on the successful transmission/reception of the multicast information, and UE status information. After multicasting the information, the information provider 1210 may request the mobile carrier to perform extra unicast IP-based transmission.

FIG. 50 is a diagram illustrating the structure of a new database stored in the HSS for registering the UE requiring unicast transmission in response to the request from the information provider 1210.

The UE identifier may be an identifier such as MSISDN as the individual identifier of the UE as a recipient of the multicast transmission. In the case that the UE is in communication, the UE IP address means the IP address of the corresponding UE which is acquired through the interface to the legacy S-GW or the new P-GW. The IP Report Condition indicate whether there is a device which wants to receive the IP address of the corresponding UE (Yes/No value) and stores, if there is a request, the identifier of the corresponding device (in the exemplary case, IP address of the multicast equipment).

Figure 51:
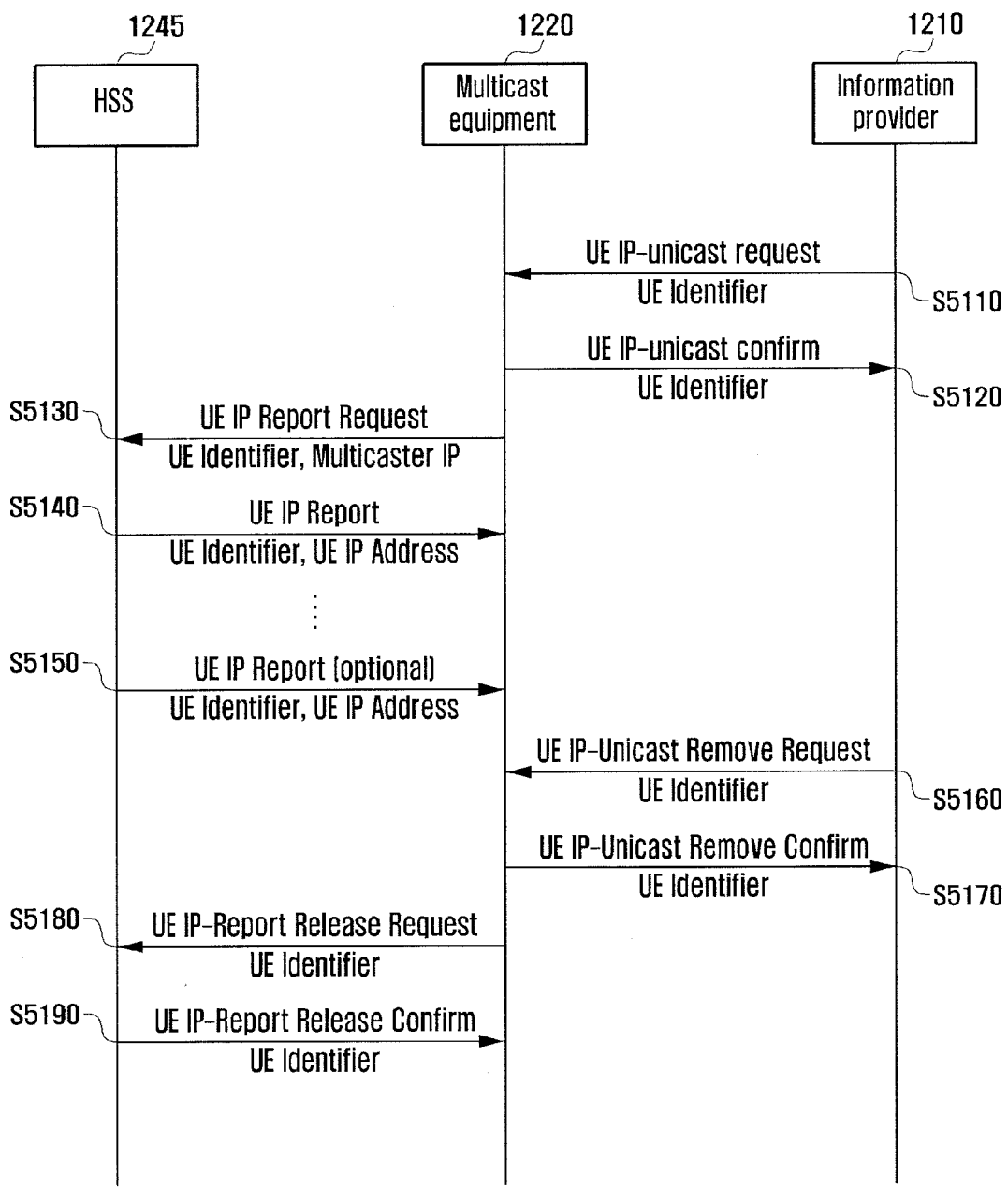
FIG. 51 is a signal flow diagram illustrating the procedure of reporting the UE's IP address change to the multicast equipment 1220.

FIG. 51 is a signal flow diagram illustrating the procedure of, when the IP address of the UE is changed, reporting this to the multicast equipment 1220.

First, the information provider 1210 sends the multicast equipment 1220 a UE-Unicast Request informing of tracing the IP address of the UE at step S5110. The UE-IP unicast request includes the identifier information of the target UE of which IP addressed traced. The multicast equipment 1220 sends the information provider 1210 a UE IP-Unicast confirm message indicating whether the message is received successfully at step S5120.

The multicast equipment 1220 sends the HSS 1245 a UE-IP Report Request message at step S5130. Then the HSS 1245 sends the multicast equipment 1220 a UE-IP Report message including the information on the changed IP address of the UE through steps S5140 and S5150 at the time when the IP address of the UE for which IP address tracking is requested.

Meanwhile, the information provider 1210 may send the multicast equipment 1220 a UE-IP Unicast Remover Request message notifying of receiving IP address information on the UE no longer at a certain time. Then the unicast equipment 1220 sends the information provider 1210 a UE-IP Unicast Remove confirm message at step S5170.

The unicast equipment 1220 sends the HSS 1245 a UE IP-Report Release Request message at step S5180 and receives a UE-IP Report Release confirm message in response to the UE IP-Report Release Request message at step S5190.

The second is the registration of the IP address of the UE requiring unicast transmission.

The second method is of registering in the mobile communication network automatically. This is of registering the IP address of the UE requiring unicast transmission by tracking the average value of the UE's radio signal strength information or RLC transmission success rate and failure rate.

For this purpose, it may be required to configure the average signal strength value of preferred target level, average success rate/failure rate, or thresholds such as minimum guaranteed signal strength and minimum guaranteed failure rate. For the UEs having the parameters greater than the thresholds, it is necessary to perform the procedure of reporting the difficulty of reliable transmission to the HSS 1245.

For this purpose, the HSS 1245 may have a new database structured as shown in FIG. 52.

FIG. 52 is a diagram illustrating a database structure stored in the HSS 1245 for registering the IP addresses of the UE having difficulty of reliability transmission with the mobile communication network automatically.

The database depicted in FIG. 52 is identical with that of FIG. 50 with the exception of some fields.

In FIG. 52, the UE Reliability Status field indicates a level of reliability the corresponding UE is experiencing currently and be represented by average/minimum signal strength, average/minimum RLC failure rate, etc. Also, the UE Target Reliability may be defined by the information provider 1210 or the mobile carrier, and even configured per UE.

In this case, the corresponding target reliability is stored in the UE Target Reliability field. Accordingly, the liability tracking and threshold value of the corresponding radio channel is sent in an additional filed through a legacy signaling procedure from the HSS 1245 to the eNB 1260 managing the corresponding UE at the time when the radio link for the UE is established.

Figure 53:
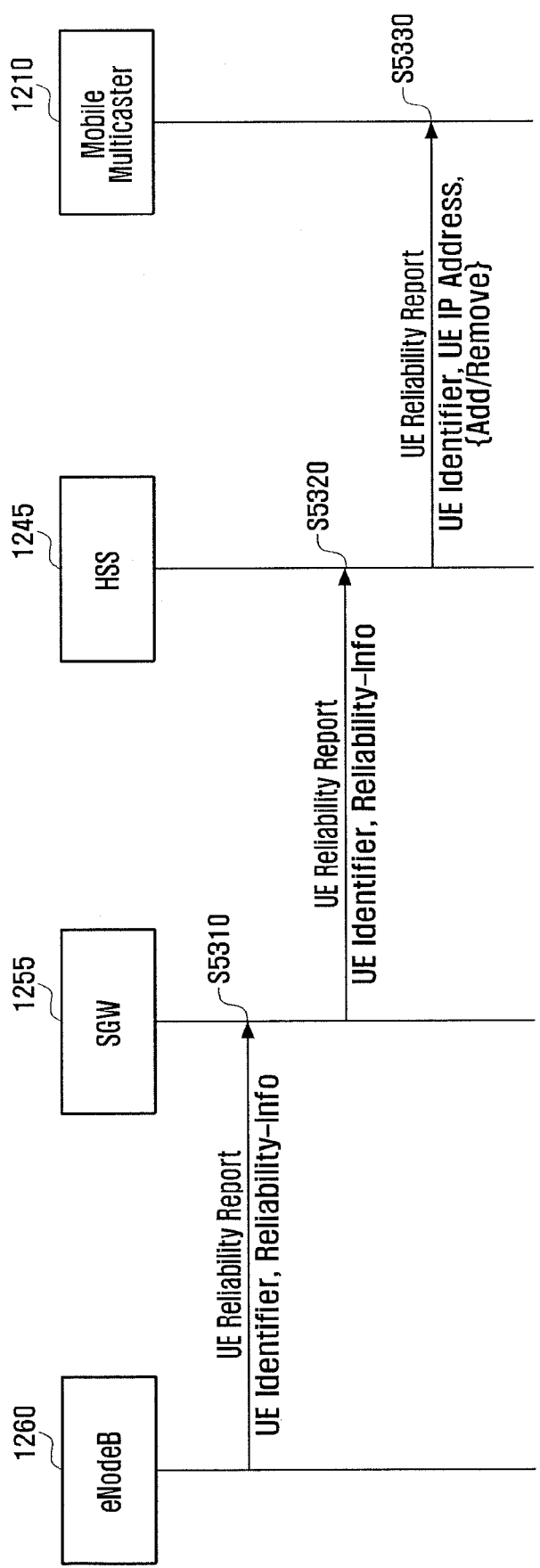
FIG. 53 is a signal flow diagram illustrating the procedure of reporting radio link reliability information to HSS and the multicast equipment.

FIG. 53 is a signal flow diagram illustrating the procedure for the eNB 1260 tracking the liability to a specific UE reports, upon detection of the necessity of report, to the HSS 1245 via SGW 1255.

First, the eNB 1260 sends the S-GW 1255 a UE-Reliability Report message at step S5310. Then the SGW 1255 forwards this message to the HSS 1245 at step S5320.

The HSS 1245 sends the multicast equipment 1210 a UE-IP Report message including the information on the reliability at step S5330. In the cast that the UE indicated in the UE IP Report message is of requiring extra IP unicast (i.e. IP Report Condition filed is set), the unicast IP address information of the corresponding UE is delivered to the multicast equipment 1210. The IP address information delivery aims to have the multicast equipment 1220 to perform IP unicast transmission to the corresponding UE. Accordingly, the HSS 1245 sets the internal file of the UE IP Report message to {ADD} value. Afterward, if the UE Target Reliability becomes equal to or greater than the threshold, the HSS 1245 sets the internal filed of the UE IP Report message to {Remove} to stop IP unicast transmission to the UE.

The description returns to FIG. 15.

The procedure of registering the MSISDN of the UE with the multicast group database as shown in FIG. 15 is similar to the procedure of registering the unicast IP address of the UE. In the case that the information provider 1210 requests for the MSISDN of the UE, however, the information provider 1210 performs only the UE's MSISDN registration procedure without necessity of transmitting UE IP-Unicast Request message.

In the case that the mobile communication network registers the UE's MSISDN automatically for unicast transmission, the procedure for the eNB 1260 to track the radio signal strength and RLC success rate/failure rate of the UE and report the result to the MME 1250 via S-GW 1255 is identical with the procedure of registering the IP address of the UE. However, it is a difference that the MME 1250 notifies the multicast equipment 1220 of only the MSISDN of the corresponding UE.

The purpose for extra management of the reliability information on the information transmission is because it is inevitable to track the information in the MTC-like data transmission unlike the legacy voice or human-communication data transmission in which the human may experience the service quality degradation directly and determine the retransmission of data finally. Although the information provider may calculate the success rate/failure rate, the reliability information acquisition and management in the mobile communication network is very important for support the M2M service such as MTC by taking notice of the sensitive issue such as billing.

Meanwhile, the present invention uses CBS designed for broadcast to all the UEs in the mobile communication network for multicast transmission addressed to specific area and group. In order to accomplish this, the group database of FIG. 13 retained in the multicast equipment 1220 has to include the information listed in FIG. 16. That is, the group database has to include the CBS Group ID for the CBS-based multicast group, Group Region as the target of the corresponding group, and the information on the transmission mode. also, the identifier of the UE belonging to the corresponding group may be included as supplementary information, and its aim and usage example are described later. The CBS group database depicted in FIG. 16 is the detailed information including the CBS group ID of FIG. 15.

FIG. 17 shows transmission modes for multicast through CBS according to an embodiment of the present invention.

First, Mode_0 is of broadcasting the corresponding information in the entire network like the convention CBS transmission as default setting of the mobile communication network.

MODE_1 is of multicasting the information to the subscribed region of the information provider 1210 such that the corresponding information is multicast in the area requested at the subscription timing.

MODE_2 is of multicasting information in the area which the UE has registered among target areas registered when the information provider 1210 has requested for multicast information transmission. For this purpose, the multicast equipment 1220 has to know the subscribers registered with the corresponding group.

In order to accomplish this, the subscriber UE information of FIG. 16 may be included additionally, and the corresponding information may be structured in the form of a list including the information such as MSISDN/IMSI.

MODE_3 and MODE_4 are the transmission modes with higher liability and described later in detail. Here, only the object of the introduction of MODE_3 and MODE_4 is described in brief. The legacy CBS operates in such a way of broadcasting and terminating broadcast regardless of the UEs' states. Particularly when the UE is connected to the mobile communication network for packet communication, the CBS information may or may not be received depending on the implementation of the mobile communication network. MODE_3 and MODE_4 are proposed to mitigate/overcome the problem in reliability.

The above-described overview of the present invention is summarized as follows with reference to FIG. 18.

The information provider 1210 sends the multicast equipment 1220 a Multicast Request message for transmitting the same information to a group of UEs at step S1805. The information provider 1210 sets the destination address of the message to the IP address allocated by the mobile carrier.

Then the multicast equipment 1220 determines whether to use the CBS multicast or MBMS multicast depending on the volume of the information requested for transmission.

If the information is small in volume, the multicast equipment 1220 determines to transmit the corresponding information in CBS multicast. Then the multicast equipment 1220 sends a CBS multicast transmission request to the CBS CENTER 1225 for transmitting the corresponding information at step S1810.

Otherwise if the information is large in volume, the multicast equipment 1220 determines to transmit the corresponding information in MBMS multicast. Then the multicast equipment 1220 sends a multicast transmission request to the MBMS center 1230 for transmitting the corresponding information at step S1820.

At the same time, the multicast equipment 1220 retransmits the corresponding information in unicast mode by taking notice of the reliability problem of the multicast transmission in which UE-specific condition is not considered. In this case, if it is configured to perform the unicast to the UE as the retransmission target through SMS, the multicast equipment 1220 sends the SMS center 1235 an SMS unicast transmission at step S1830.

If it is configured to perform the unicast to the UE as the retransmission target through IP, the multicast equipment 1220 sends an IP unicast transmission request to the PDN gateway 1240.

As described above, the transmission method of the present invention performs CBS multicast and MBMS multicast selectively depending on the volume of the information to be transmitted and, in addition, SMS unicast or IP unicast for enhancing the transmission reliability.

Figure 19:
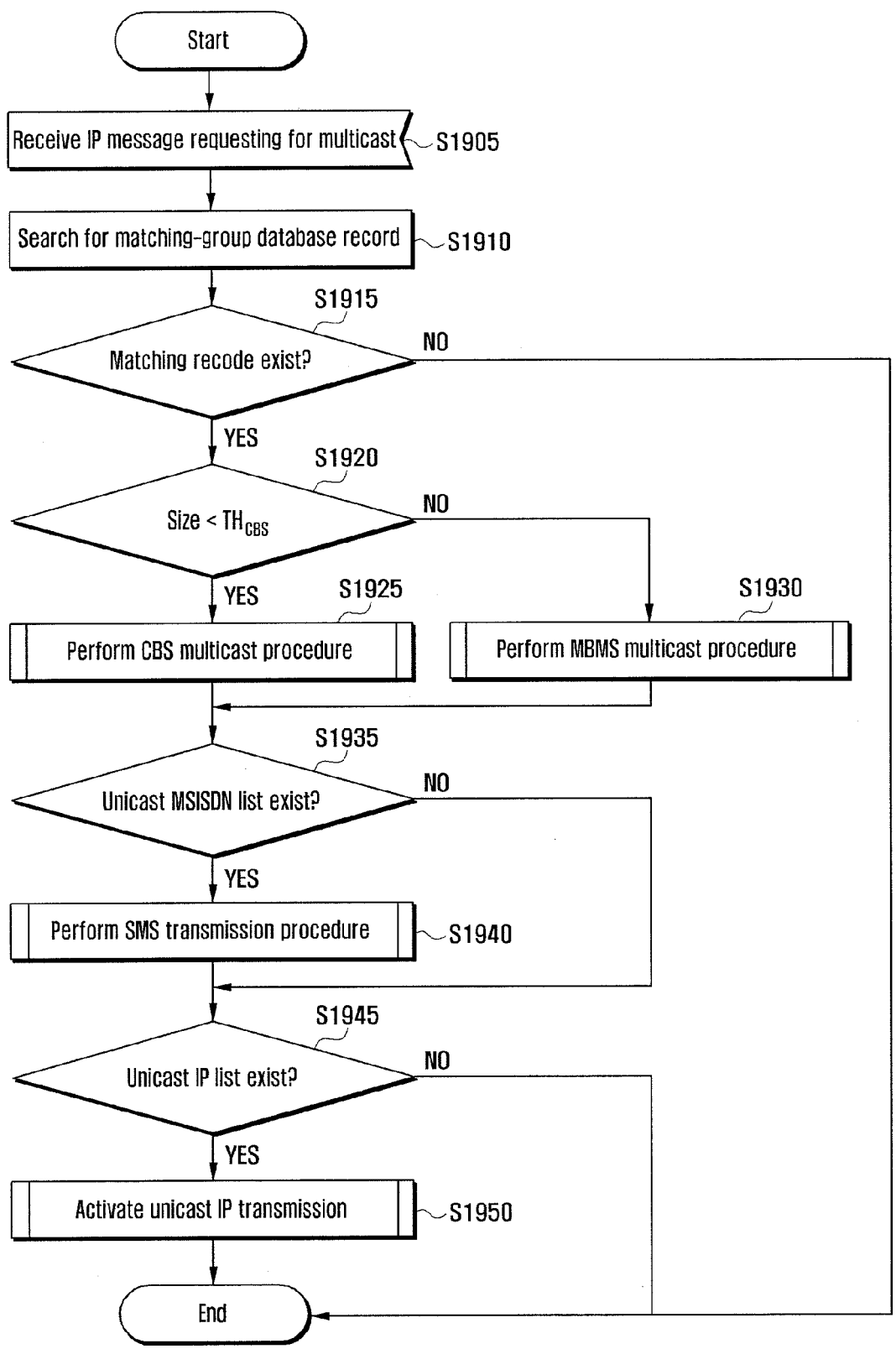
FIG. 19 is a flowchart illustrating the operation procedure of the multicast equipment 1220 according to an embodiment of the present invention.

FIG. 19 is a flowchart illustrating the operation procedure of the multicast equipment 1220 according to an embodiment of the present invention.

First, the multicast equipment 1220 receives an IP message requesting for multicast from the information provider 1210 at step S1905. Then the multicast equipment 1220 searches the multicast group database as shown in FIG. 15 based on the destination IP address of the received IP message at step S1910. Next, the multicast equipment 1220 determines whether the corresponding group IP address exists at step S1915. If the corresponding group IP address exists, the multicast equipment 1220 processes the corresponding message at step S1920 and subsequent steps. Otherwise, if no corresponding group IP address exists, the multicast equipment 1220 discards the IP address received from the information provider 1210.

The multicast equipment 1220 calculates the size of the received IP message at step S1920. The size of the IP message may be calculated differently depending on the mobile communication technology. The first method is of calculating the size of the whole IP message in the case of 3GPP LTE as a technology with large message size (about 8000 bytes) available for CBS transmission. The second method is of calculating the payload size of layer 7 contents by removing the protocol overhead such as IP/TCP/UDP/HTTP/SIP in the case of 3GPP 2G/4G as a technology with small message size (about 80 bytes) available for CBS transmission. This can be considered as the implementation issue depending on the information transmitted/received by the group using CBS.

The multicast equipment 1220 compares the calculated IP message size with a predetermined threshold (e.g. about 80 bytes of 3GPP 2G/3G and about 8000 bytes of 3GPP LTE) at step S1920. If the calculated IP message size is less than the threshold, the multicast equipment 1220 multicasts the information contained in the received IP message to the group of UEs through CBS at step S1925.

Otherwise, if the calculated IP message size is equal to or greater than the threshold, the multicast equipment 1220 multicasts the corresponding information through MBMS at step S1930.

Since CBS and MBMS transmissions are not guaranteed, the UE having low reception success rate is likely to fail receiving the information transmitted in CBS multicast or MBMS multicast. In order to overcome this problem, after multicast transmission, the unicast transmission is performed additionally to the pre-registered UEs in SMS unicast or IP unicast.

For this purpose, after the multicast transmission, the multicast equipment 1220 determines whether a Unicast MSISDN List exists in the multicast group database at step S1935. If the Unicast MSISDN List exists, the multicast equipment 1220 transmits the same information to the UEs listed in the list in SMS unicast at step S1940.

The multicast equipment 1220 determines whether a Unicast IP List exists in the multicast group database at step S1945. If the Unicast IP List exists, the multicast equipment 1220 transmits the same information to the UEs listed in the list in IP unicast at step S1950.

As described above, the method of the present invention is capable of guaranteeing reliability of the information transmission by performing unicast transmission to the UEs predicted to fail receiving information transmitted in multicast.

Figure 20:
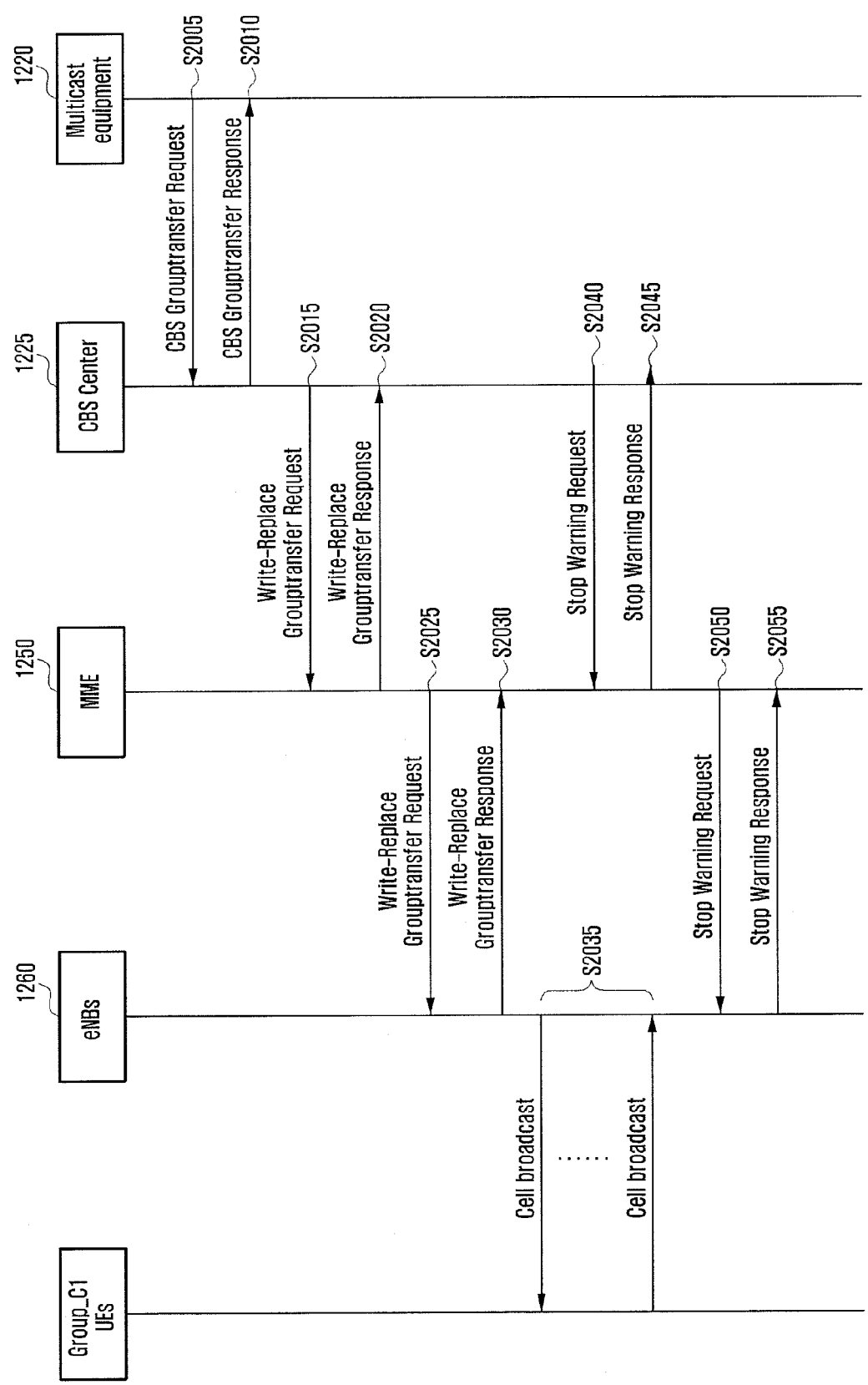
FIG. 20 is a signal flow diagram illustrating detailed procedure of performing CBS multicast transmission of the multicast equipment 1220 at step S1925 of FIG. 19.

FIG. 20 is a signal flow diagram illustrating detailed procedure of performing CBS multicast transmission of the multicast equipment 1220 at step S1925 of FIG. 19.

Once CBS multicast transmission has been selected, the multicast equipment 1220 sends the CBC 1225 a CBS Grouptransfer Request message at step S2005. The detailed format of the CBS Grouptransfer Request message is depicted in FIG. 22.

As shown in FIG. 22, the CBS Grouptransfer Request message includes a Group ID for identifying the corresponding multicast group, a Sequence number for redundancy test of the message, target region information (Group Region) for transmitting the corresponding multicast message, a Transfer Mode requesting for improvement of reliability and economical efficiency in multicast of the CBC 1225, and information (Contents) to be transmitted.

Figure 21:
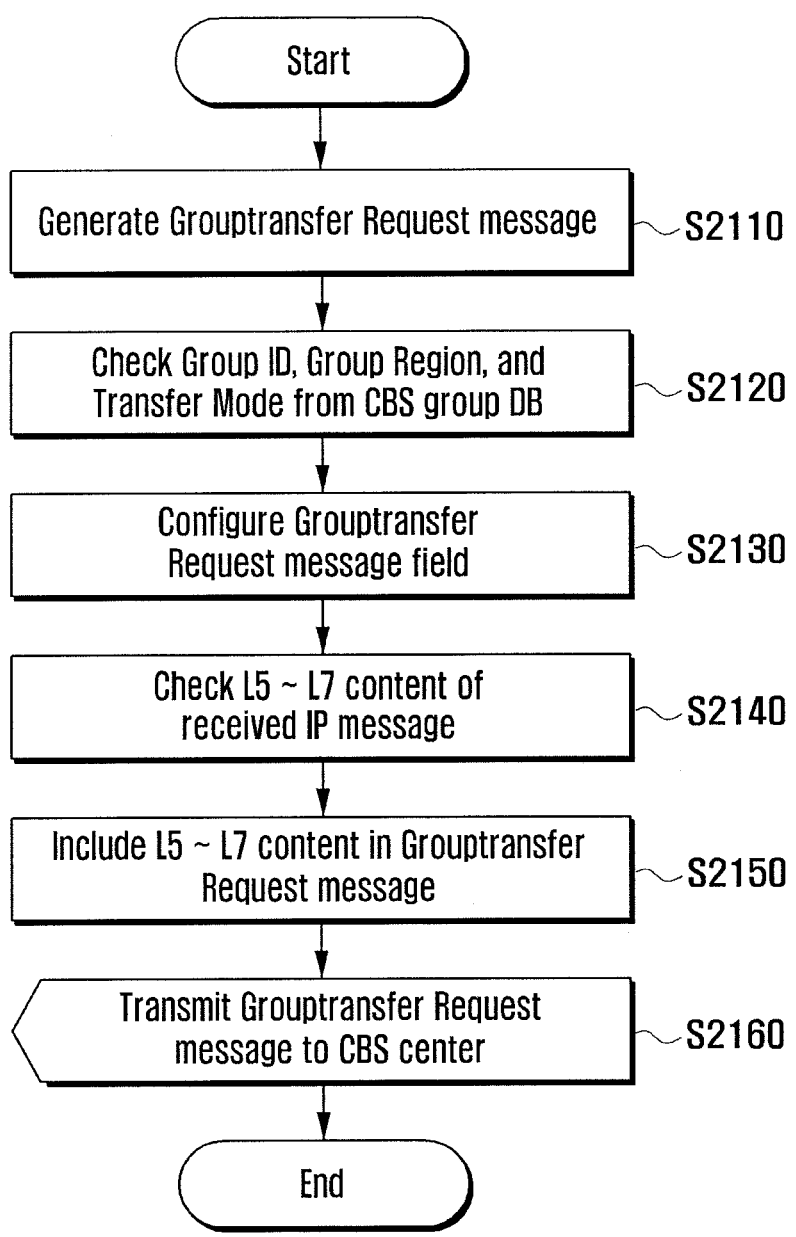
FIG. 21 is a flowchart illustrating the operation procedure of the multicast equipment 1220 according to an embodiment of the present invention.

Among them, Group ID, Group Region, and Transfer Mode are generated based on the database information depicted in FIG. 16. As shown in FIG. 21, the information to be transmitted (Contents) corresponds to the layers 5 to 7 information or layer 7 information. This is the process for reducing information amount. FIG. 21 is directed to the 3GPP 2G/3 and, assuming 3GPP LTE, it is possible to transmit the entire IP message as contents other than the higher layer information.

Returning to FIG. 20, in response to the CBS Grouptransfer Request message, the CBC 1225 sends the multicast equipment 1220 a CBS Grouptransfer Response message. The detailed format of the CBS Grouptransfer Response message is depicted in FIG. 23.

As shown in FIG. 23, the CBS Grouptransfer Response message includes the Group ID received in the CBS Grouptransfer Request message, Sequence Number for redundancy check on the message to be transmitted, and Cause field carrying the information on success or error.

Referring to FIG. 20, subsequent to the exchange of CBS Grouptransfer Request message and CBS Grouptransfer Response message, the procedure progresses with the same messages and order as those of the legacy CBS operation procedure (with the exception that word 'warning' in the message name is changed for 'grouptransfer'). Accordingly, detailed description on the procedure after step S2015 is omitted herein. However, since the operations of the devices in association with the corresponding messages and process and internal items of the message are necessary to be modified to the technique proposed in the present invention, only the modified parts are described.

First, the CBS messages that could not be multicast are modified as follows.

The format of the Write-Replace Warning Request message exchanged among the CBC 1225, MME 1250, and eNB 1260 is depicted in FIG. 24.

In the message depicted in FIG. 24, the Grouptransfer Area List denotes the target area of the corresponding multicast group and is same as in the legacy message with the exception that the name has been changed. The Concurrent Message Indicator is also same as in the legacy message with the exception that the word 'Warning' is removed in the name. In the case of the message identifier, a new identifier for identifying the Grouptransfer message is added as 1004 as shown in FIG. 25. The identifier '1004' is an example and thus may be replaced by a different value.

The Grouptransfer Security Information of FIG. 24 is for use of authentication between the information provider 1210 transmitting the group information and the UE or between the mobile carrier and the UE. That is, the UE determines whether the corresponding message is valid based on the Grouptransfer Security Information. In the present invention, detailed description on the group transfer securing information generation and delivery method is omitted.

The Grouptransfer Message Contents is the field containing the information to be multicast to a group. If it is determined that the message is a CBS message for group multicast based on the Message Identifier, the UE checks the Grouptransfer Type filed to determine whether it is a member of the group receiving the CBS message.

The detail of the Grouptransfer type field is depicted in FIG. 26. The Grouptransfer type field contains the group identifier for identifying the group as the destination of the corresponding CBS message and, in the case that the security information is verified, the UE registered with the group reads the corresponding information. If necessary, it is possible to encode/decode the corresponding information by applying a ciphered key between the UE and CBC 1225 or multicast equipment 1220.

Returning to FIG. 20, the multicast transmission is performed through modified Write-Replace Grouptransfer Request/Response messages. In the case of the Stop Grouptransfer Request/Response messages, the legacy Stop Warning Request/Response messages are reused with changed message names. However, the Warning Area List of the Stop Warning Request message is replaced with the Grouptransfer Area List.

FIG. 21 is a flowchart illustrating the operation procedure of the multicast equipment 1220 performing CBS multicast transmission in FIG. 20.

First, the multicast equipment 1220 receives an IP message requesting for multicast transmission from the information provider 1210. Then the multicast equipment 1220 generates a group transmission request message at step S2110. Next, the multicast equipment 1220 searches the multicast group database for group ID, Group Region, and Transfer Mode.

The multicast equipment 1220 configures the fields of the group transfer request message at step S2130. The multicast equipment 1220 checks the layer 5 to layer 7 contents in the IP message at step S2140 and configures the layer 5 to layer 7 contents into the group transfer request message at step S2150.

The multicast equipment 1220 sends the group transfer request message to the CBC 1225 at step S2160.

Meanwhile, if the CBS multicast transmission is performed through the procedure depicted in FIG. 20, the UEs receive the message within the message reception area.

According to an embodiment of the present invention, all UEs store the Search List as depicted in FIG. 27. The search list contains the message identifiers for identifying the messages which the corresponding UE can receive among the message broadcast through CBS.

Compared to the conventional invention, the present invention adds message identifier '1004' for identifying the group multicast message as shown in FIG. 25, and the UE can check the inclusion of this message. The UE also has the identifier information on the group with which it is registered. Here, it is assumed that the mobile communication terminal belongs to Group_C2.

Figure 28:
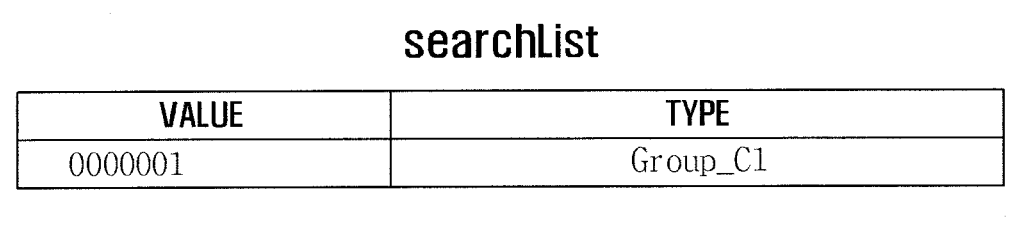
Figure 29:
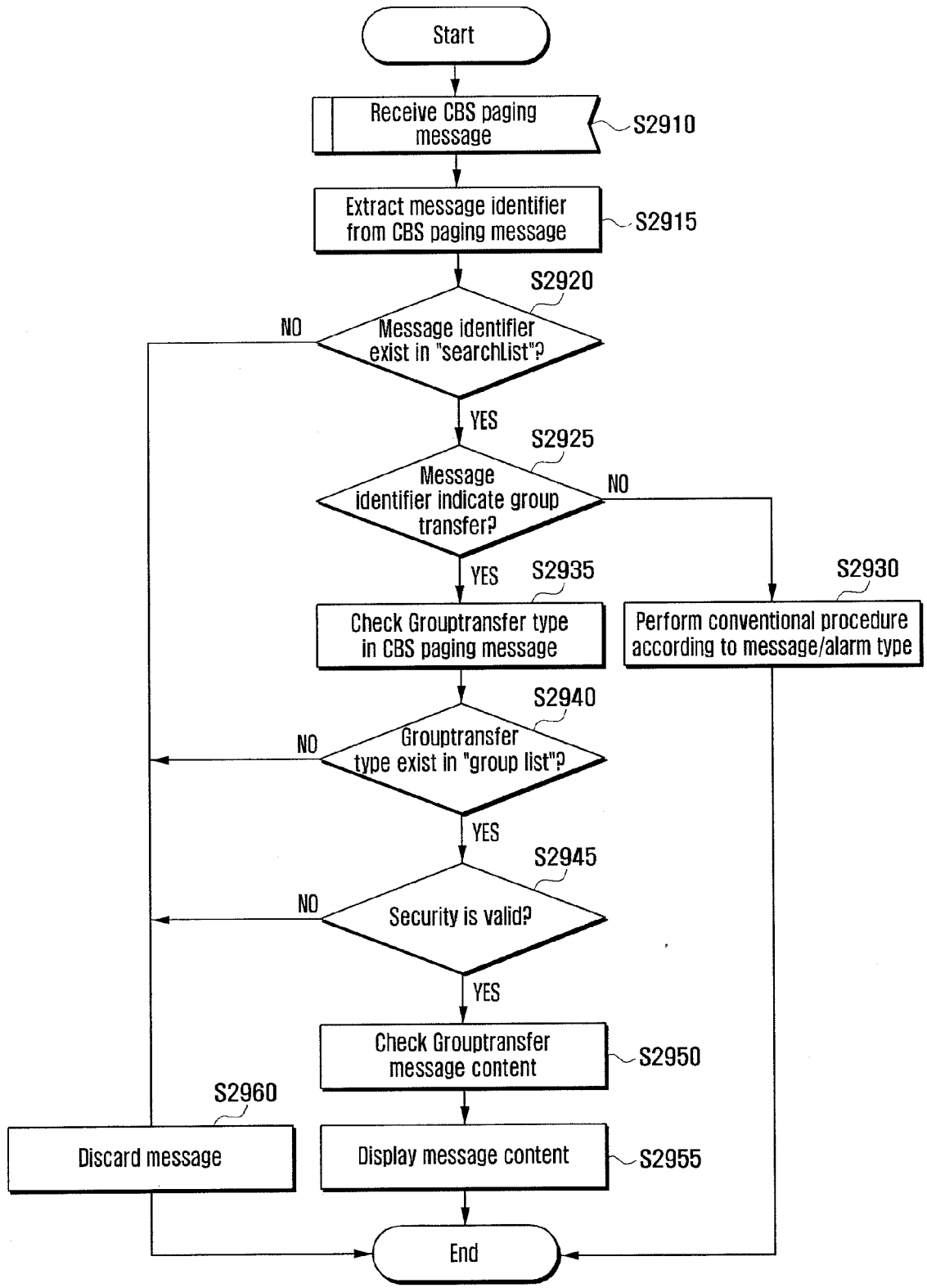
FIG. 29 is a flowchart illustrating the operation procedure of terminal processing the information transmitted in CBS multicast.

FIG. 29 shows the operation procedure for the UE having the informations of FIGS. 27 and 28 to receive the information transmitted in CBS multicast.

First, the UE receives a CBS paging message at step S2910. Then the UE extracts the message identifier from the received CBS paging message at step S2915. Next, the UE determines whether the message identifier exists in the search list of the UE as shown in FIG. 27 at step S2920. If the message identifier exists in the search list, the UE determines it can process the message so as to progress to the next step and, otherwise, stops processing the message.

If the message identifier exists, the UE determines whether the extracted message identifier is a normal broadcast message identifier or a group multicast transmission message identifier at step S2925. For this purpose, the UE may check whether the extracted message identifier is set to 1004 as shown in FIG. 27.

If the message identifier is the normal broadcast message identifier, the UE performs the legacy message processing operation at step S2930. Otherwise, if the message identifier is the group multicast transmission message identifier, the UE checks the Grouptransfer Type field of the received message to check the group to which the message is addressed at step S2940. If the group is not registered with the search list of FIG. 28, the UE discards the message at step S2960 and, otherwise if registered, determines whether the security information is valid at step S2945. The detailed information value and distribution method for security is not dealt with in the present invention.

If the security is verified, the UE checks the group transmission message content at step S2950 to display the message content at step S2955.

Meanwhile, the conventional CBS transmission is not guaranteed in reliability. That is, it is designed such that the mobile carrier does not know whether the UE has received the corresponding information successfully or not. However, if the information provider 1210 requests for multicast to a group, it is basically requested to guarantee the reliability of the corresponding information. Also, it is required for the mobile carrier to perform profitable CBS transmission using the appropriate radio resource.

For this purpose, the present invention defines a method for providing the CBS multicast transmission service requested by the multicast equipment 1220 with economical efficiency and reliability.

First, a description is made of the method for providing the CBS multicast transmission service economically.

Figure 30:
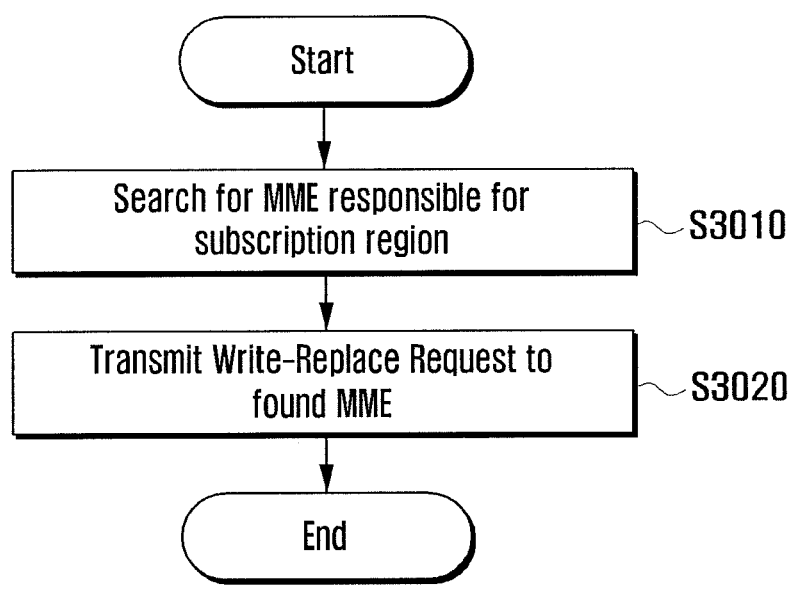
FIGS. 30 and 31 are flowcharts illustrating the method of providing CBS multicast service economically.

One of the simplest methods for providing the CBS multicast transmission service economically is to perform the CBS multicast transmission to an area requested by the information provider 1210. The operation flowchart of the CBC 1225 for this is depicted in FIG. 30.

If a CBS multicast transmission request is received from the multicast equipment 1220, the CBC 1220 checks the MMEs serving the areas requested by the information provider 1210 at step 3010. Then the CBC 1220 sends the found MME a Write-Replace Grouptransfer Request message at step S3020.

Figure 31:
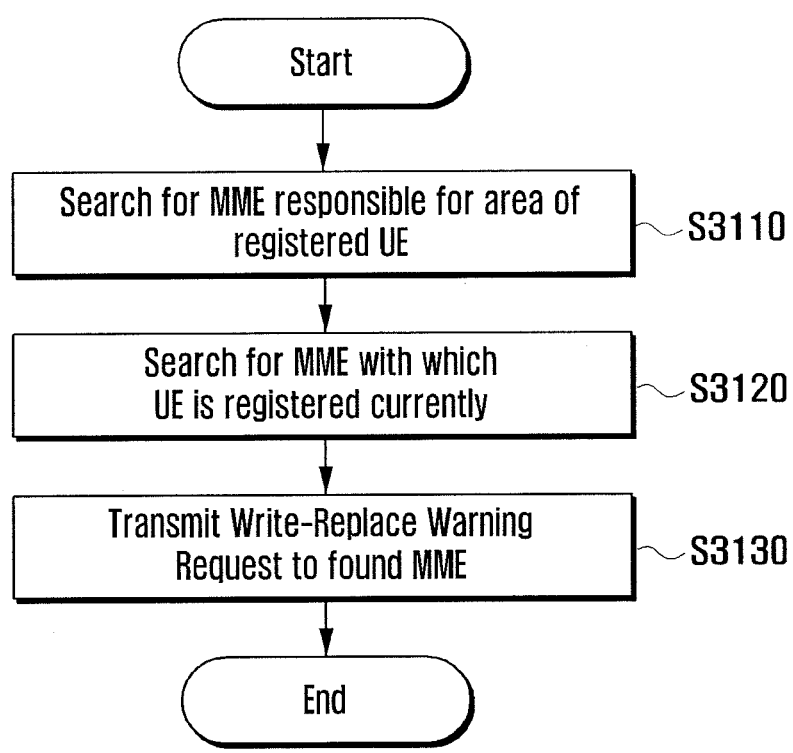

The second method for providing the CBS multicast transmission service economically is to perform the CBS group multicast transmission to an area requested by the information provider 1210, however, not all requested areas but the area with which the UE belonging to the corresponding group is registered. The detailed procedure thereon is depicted in FIG. 31.

The CBC 1220 searches for the MME responsible for the area with which the UE is registered. The CBC searches for the MME with which the UE is registered currently at step S3120 and sends the Write-Replace Grouptransfer Request message to the found MME at step S3130. Through this procedure, it is possible to save radio resource.

The method for the multicast equipment 1220 to search for the MMEs with which the UEs are registered can be implemented in various ways. This can be possible to modify or implementing a standard technology. The first method is implemented in such a way that a specific MME processes the UE of the information provider 1210. Accordingly, the multicast equipment 1220 is capable of requesting the MME assigned to the information provider 1210 for the information on whether the UE is registered as the multicast target.

The second method is available for the case where the MMEs are mapped to the respective areas. In this case, the multicast equipment 1220 has the information on the area as its target. Accordingly, the multicast equipment 1220 is capable of acquiring the information on the MME responsible for the target area automatically or manually based on the mobile communication network design information and check whether the UE is registered with the corresponding MME or not.

The third method is to send, when the terminal of the information provider 1210 is registered with the HSS, the information on the MME managing the corresponding UE to the multicast equipment 1220 performing the multicast transmission to the terminal.

The fourth method is to configure a separate HSS for MTC-like UEs as the targets of the multicast. In this way, the multicast equipment 1220 always maintains the interface only with the corresponding HSS, checks the MMEs responsible for the UEs as the targets of the multicast through the corresponding HSS, and determines whether the UE is registered with the corresponding MME or not. It is also possible to find the MME for each UE through legacy SLF/HSS Next, a description is made of the method for providing reliable CBS multicast transmission service.

Figure 32:
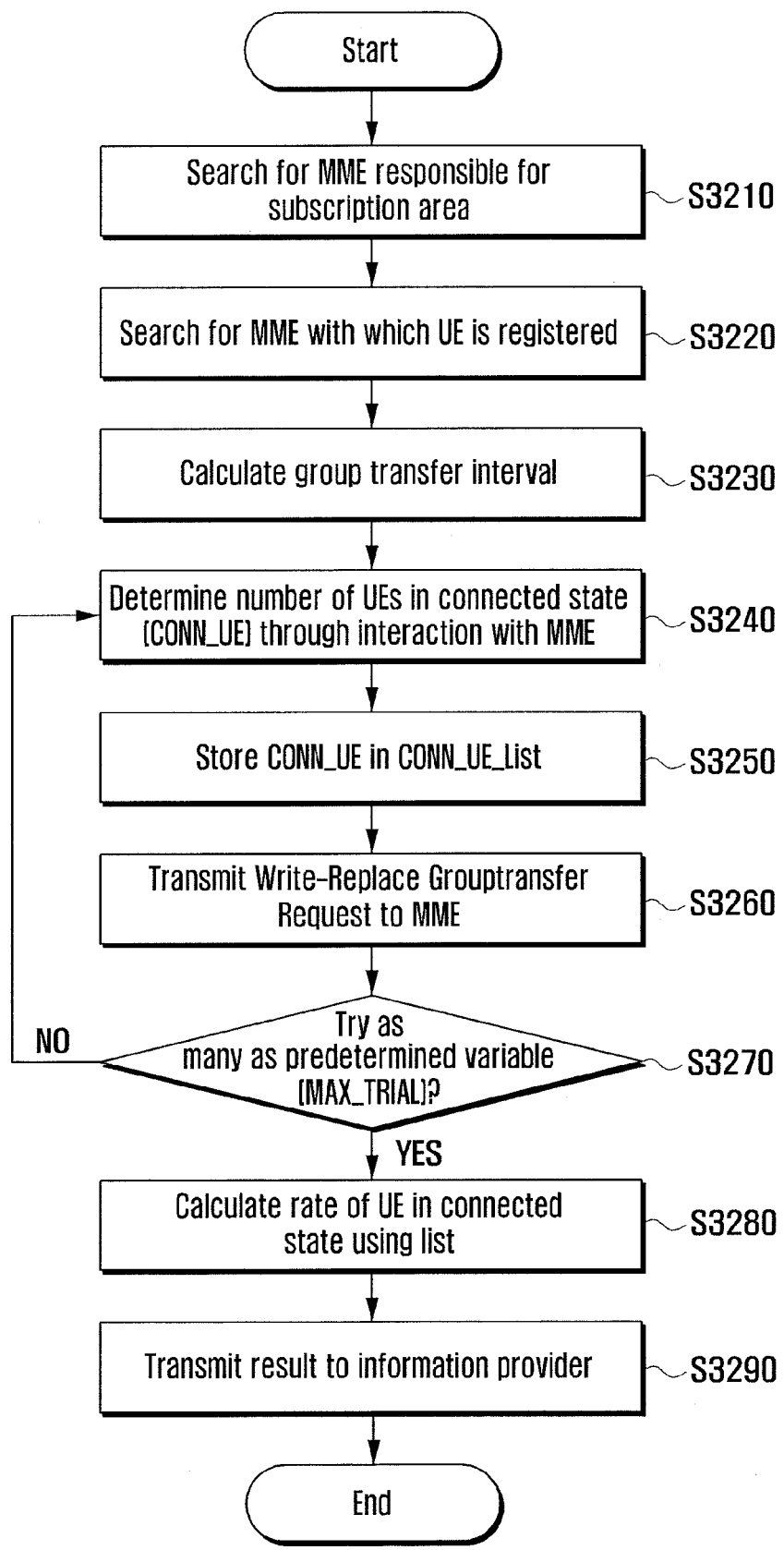
FIG. 32 is a flowchart illustrating the reliable CBS multicast transmission procedure of the CBS center 1225 according to an embodiment of the present invention.

FIG. 32 is a flowchart illustrating the CBS multicast transmission procedure of the CBC 1225 with a guarantee of reliability according to an embodiment of the present invention.

In more detail, FIG. 32, as an enhanced version of FIG. 31, shows the method of complementing the situation where the UE operating in tack transmission mode (in connected state) may not the CBS multicast.

FIG. 32 is identical with FIG. 31 in the procedure, i.e. steps S3210 and S3220, for the CBC 1225 to perform CBS multicast to the area with which the current UE is registered within the area requested by the information provider 1210. In FIG. 32, the CBC 1225 checks whether the UEs as the recipients are in the connected state at the time when the CBS multicast transmission starts. That is, the CBC checks whether the UE support packet transmission.

The CBC 1225 defines a system variable represented by MAX_TRIAL and counts a predetermined number of retransmissions and calculates a number of UEs performing packet communications at every transmission time point. Afterward, the CBC 1225 calculates average rate of packet transmission UEs in the CBS multicast transmission mode to predict the reliability the reliable transmission in the CBS multicast mode numerically. If necessary, the statistical success rate information is provided to the information provider 1210. Here, the packet transmission capability of the UE may be checked in such a way of searching for the MME managing the state of the corresponding terminal and receiving the information on whether the corresponding UE is in active/idle state.

The detailed procedure depicted in FIG. 32 is described on the above description. First, the CBC 1225 searches for the MME responsible for the subscription area of the UEs to which the CBS multicast is addressed at step S3210. Next, the CBC 1225 searches for the MME with which the UE is registered currently at step S3220. Next, the CBC 1225 calculates the group transmission interval at step S3230.

The CBC 1225 determines the number of UEs in connected mode (CONN_UE) through interaction with the MME at step S3240. That is, the CBC 1225 determines the number of UEs transmitting packets. The CBC 1225 stores the number of UEs in connected mode into the connected mode UE list (CONN_UE_LIST) at step S3250. Next, the CBC 1225 sends the found MME a Write-Replace Grouptransfer Request message at step S3260.

The CBC 1225 determines whether a number of transmissions has reached a configured variable (MAX_TRIAL) at step S3270. If the number of transmission has not reached the configured variable, the CBC 1225 returns the procedure to step S3240 to perform subsequent steps repeatedly.

Otherwise if the number of transmissions has reached the configured variable, the CBC 1225 calculates the rate of the UEs in connected state using the connected mode UE list at step S3280 and sends the calculation result to the information provider 1210 at step S3290.

A description is made of the method for providing reliable CBS multicast transmission hereinafter with reference to FIG. 33.

Figure 33:
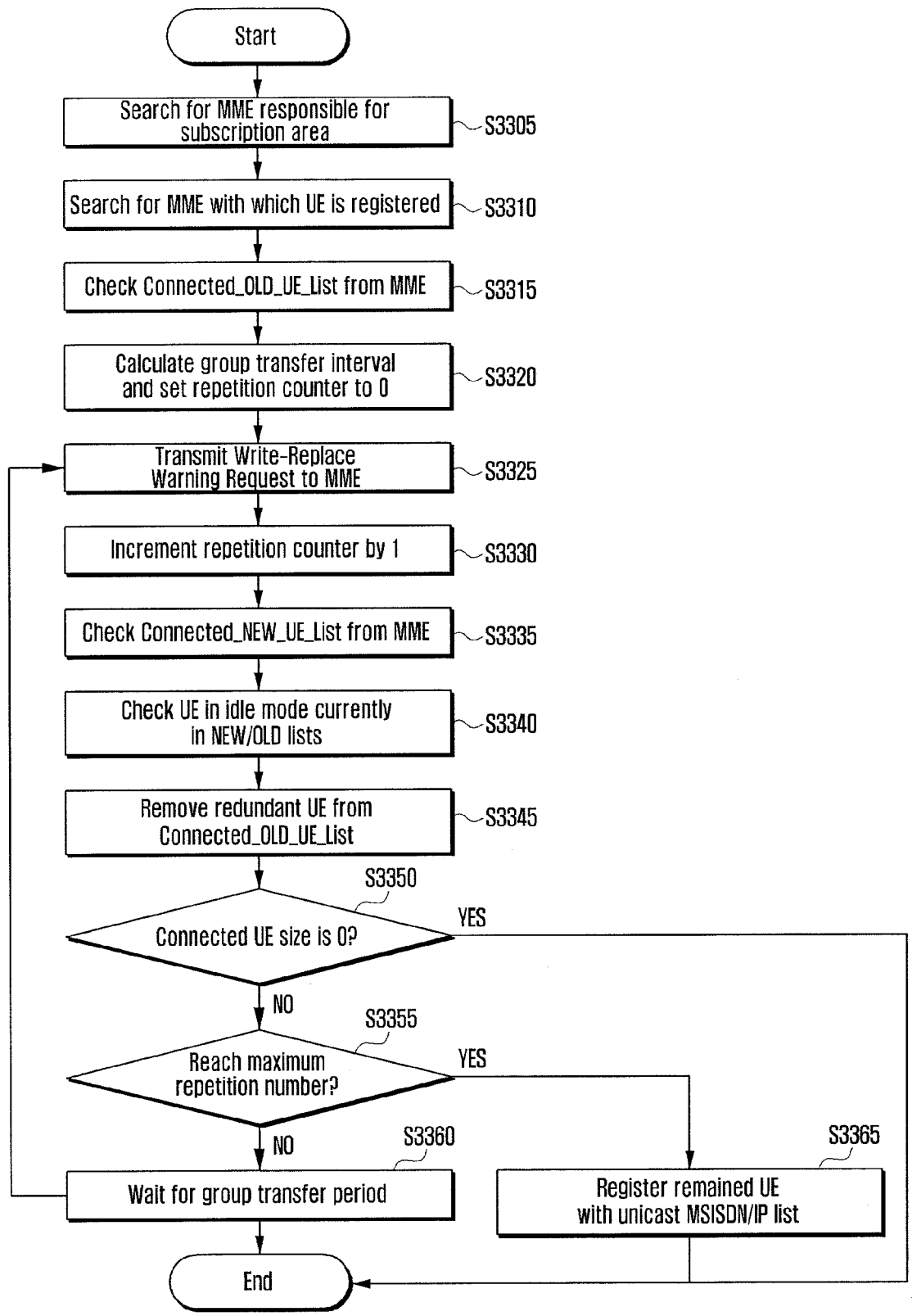
FIG. 33 is a flowchart illustrating the reliable CBS multicast transmission method according to an embodiment of the present invention.

Like the case of FIG. 32, the CBC 1220 searches for the MME of the area requested by the information provider 1210 and checks the states of the UEs belonging to the corresponding group through the corresponding MME in FIG. 33. That is, the CBC 1220 checks the identifier of the corresponding UE and whether the UE is in active or idle mode for packet transmission. The CBC 1220 generates a list with the initially checked information as the connected UE list (Connected_OLD_UE_List). The CBC 1220 performs CBS multicast transmission in the corresponding area. After completing the CBS multicast transmission, the CBC 1220 checks the state of the UEs belonging to the group through the MME again to store the packet transmission state list of the UEs in a new connected UE list (Connected_NEW_UE_List). The CBC 1220 checks the Connected_OLD_UE_List and the Connected_NEW_UE_List and remove the information on the UEs in idle mode in both the lists.

After removing the corresponding information, the CBC 1220 updates the state information of the UEs included in the Connected_OLD_UE_List and the Connected_NEW_UE_List. This is to remove the UEs having high reception probability in the idle state before and after all transmission so as to increase the reception success probabilities of all UEs repeatedly because there are UEs capable of receiving the CBS multicast information only in the idle state.

Although the corresponding procedure is repeated in order for all UEs to receive the signal, the number of repetition is limited to a system variable such as maximum trial (MAX_TRIAL).

Like the description with reference FIG. 32, whether the UE is in active or idle state is checked by searching for the MME managing the state of the corresponding UE and receiving information on the UE's state (Active or Idle) from the corresponding MME.

In the case of the UE remained in the Connected_OLD_UE_List even after the CBS multicast transmission as many as MAX_TRIAL defined as the system information, it can be consider to perform SMS unicast or IP unicast additionally. Also it can be considered to register the corresponding UE with the Unicast MSISDN/IP List automatically as shown in FIG. 15.

The flowchart of FIG. 33 is described based on the above description hereinafter. First the CBC 1225 searches for the MME responsible for the subscription area at step S3305. Next, the CBC 1225 searches for the MME with which the UE is currently registered at step 3310. Next, the CBC 1125 searches for the connected state UE list from MME at step S3315. Next, the CBC 1225 calculates the group transmission interval and sets the repeat counter to 0. Next, CBC 1225 increment the repeat counter by 1 at step S3330 and searches for the new connected state UE list from the MME at step S3335.

The CBC 1225 searches the Connected_OLD_UE_List and Connected_NEW_UE_List for the UEs in idle state currently at step S3340. The CBC 1225 removes the UE included in both the lists from the Connected_OLD_UE_List at step S3345. The CBC 1225 determines whether the size of the connected state UE list is 0 at step S3350. If size of the connected state UE is 0, the CBC 1225 ends the procedure.

If the size of the connected state UE list is not 0, the CBC 1225 determines whether a number of CBS multicast transmissions has reached the maximum repetition number. If the number of CBS multicast transmissions has not reached the maximum repetition number, the CBS 1225 wait for the group transmission period at step S3360 and returns the procedure to step S3325 to perform the subsequent steps again.

Otherwise, if the number of CBS multicast transmissions has reached the maximum repetition number, the CBC 1225 registers the remained UEs with the unicast MSISDN/IP list at step S3365.

Figure 48:
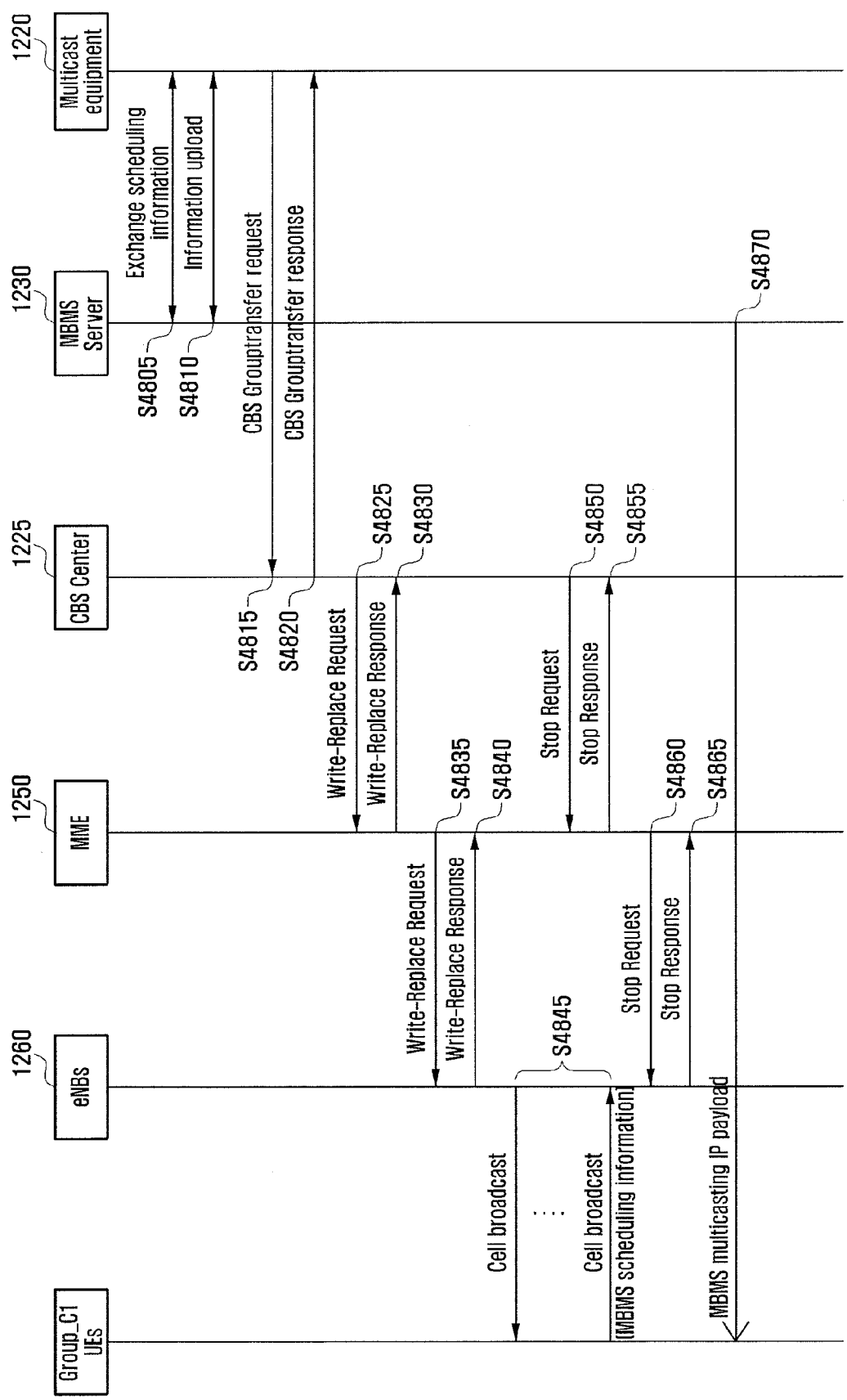
FIG. 48 is a signal flow diagram illustrating the multicast transmission procedure through MBMS in FIG. 19.

Meanwhile, the MBMS multicast procedure of FIG. 19 is depicted in FIG. 48.

Prior to the explanation of the detailed operation, the multicast equipment 1220 negotiates with the MBMS server 1230 to check the scheduling information such as time and channel for transmission of the corresponding information. Afterward, the information provided by the information provider 1210 is transmitted through MBMS multicast to the UEs via the MBMS server 1230.

A description is made of the flowchart depicted in FIG. 48 based on the above description. The multicast equipment 1220 exchanges scheduling information with the MBMS server 120 at step S4805.

The multicast equipment 1220 sends the CBC 1225 a CBS Grouptransfer Request message for delivery of the scheduling information on the MBMS multicast transmission to the UEs at step S4815. The multicast equipment 1220 receives a replay in response to the CBS Grouptransfer Request message at step S4820.

Then the CBC 1220 sends the respective UEs the scheduling information for MBMS multicast transmission at steps S4825 to S4845. Since steps S4825 to S4845 are identical with those of the conventional CBS transmission, detailed descriptions thereon are omitted herein.

If the MBMS multicast transmission time indicated in the scheduling information arrives, the MBMS server 1230 performs MBMS multicast at step S4870.

Figure 49:
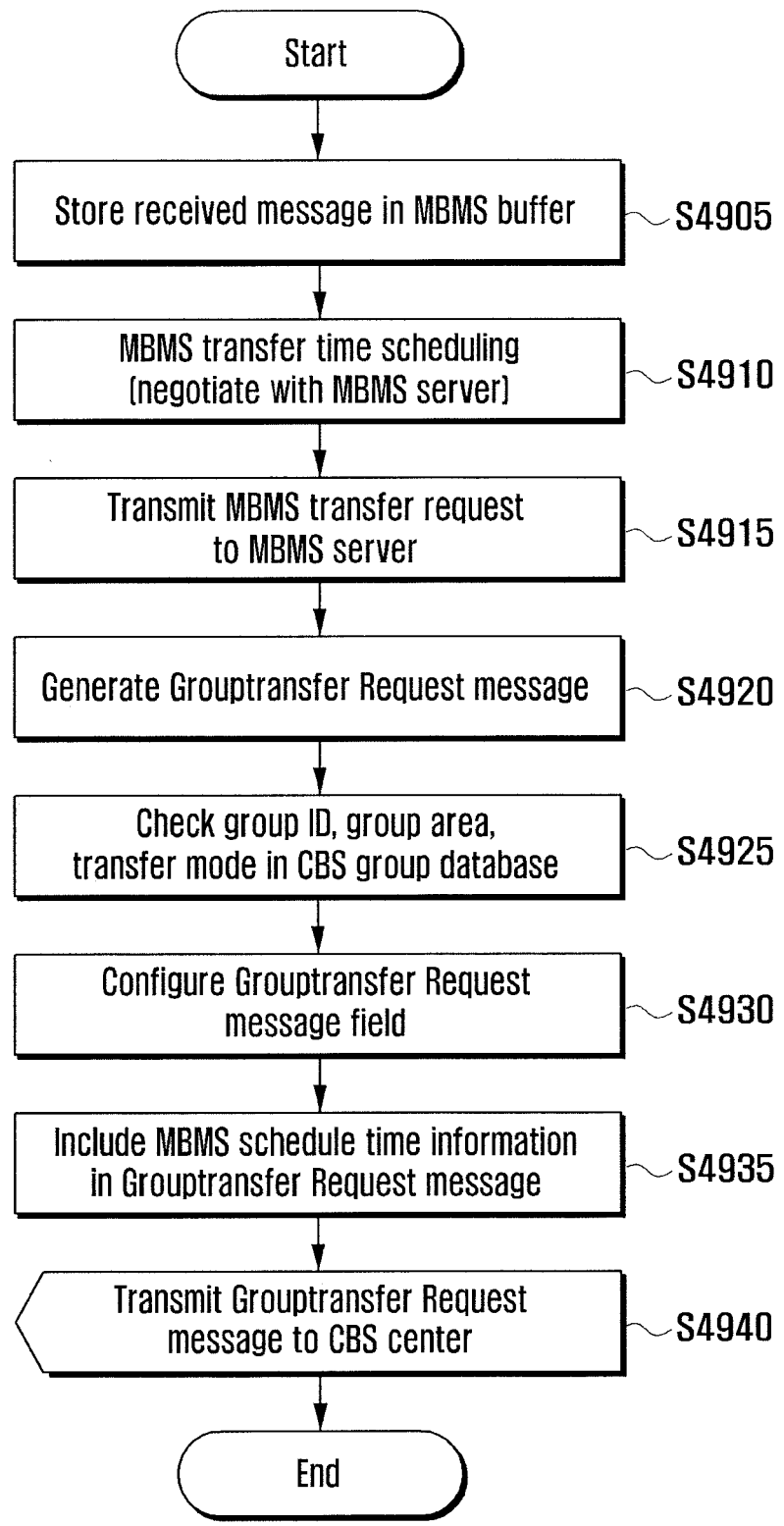
FIG. 49 is a flowchart illustrating the detailed operation procedure of the multicast equipment 1220 performing MBMS multicast transmission request in FIG. 48.

FIG. 49 is a flowchart illustrating detailed operation procedure of the multicast equipment 1220 performing MBMS multicast transmission request in FIG. 48.

First, the multicast equipment 1220 stores the IP message received from the information provider 1210 in the MBMS buffer at step S4905. Next, the multicast equipment 1220 negotiates with the MBMS server 1230 for scheduling of MBMS multicast transmission time.

If the scheduling negotiation has completed, the multicast equipment 1220 sends the MBMS server 1230 a MBMS transmission request at step S4915. The multicast equipment 1220 generates a CBS Grouptransfer Request message for delivery of the scheduling information at step S4920. The multicast equipment 1220 searches the CBS group database for the group ID, group area, and transfer mode at step S4925. The multicast equipment 1220 configures the group transmission request message field at step S4930 and includes the MBMS scheduling information in the group transmission request message at step S4930. The multicast equipment 1220 sends the CBC 1225 the group transmission request message at step S4940.

Figure 18:
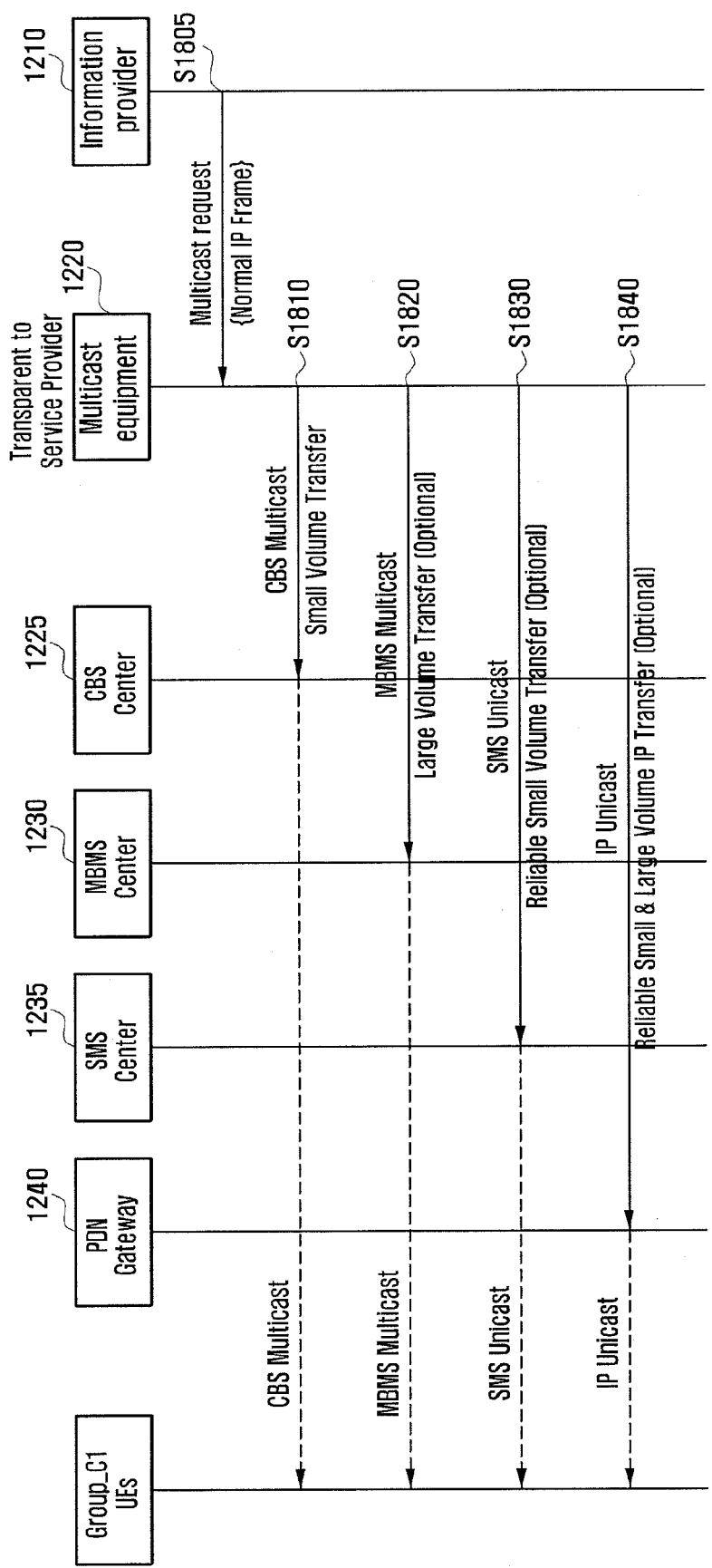
FIG. 18 is a signal flow diagram illustrating the group multicast procedure according to an embodiment of the present invention.

In the embodiment of FIG. 18, it is assumed that the multicast equipment 1220 is transparent to the information provider 1210. That is, the information provider is not aware of the multicast equipment 1220 and thus transmits the information to be multicast to the IP address allocated by the mobile carrier as the destination address.

Figure 34:
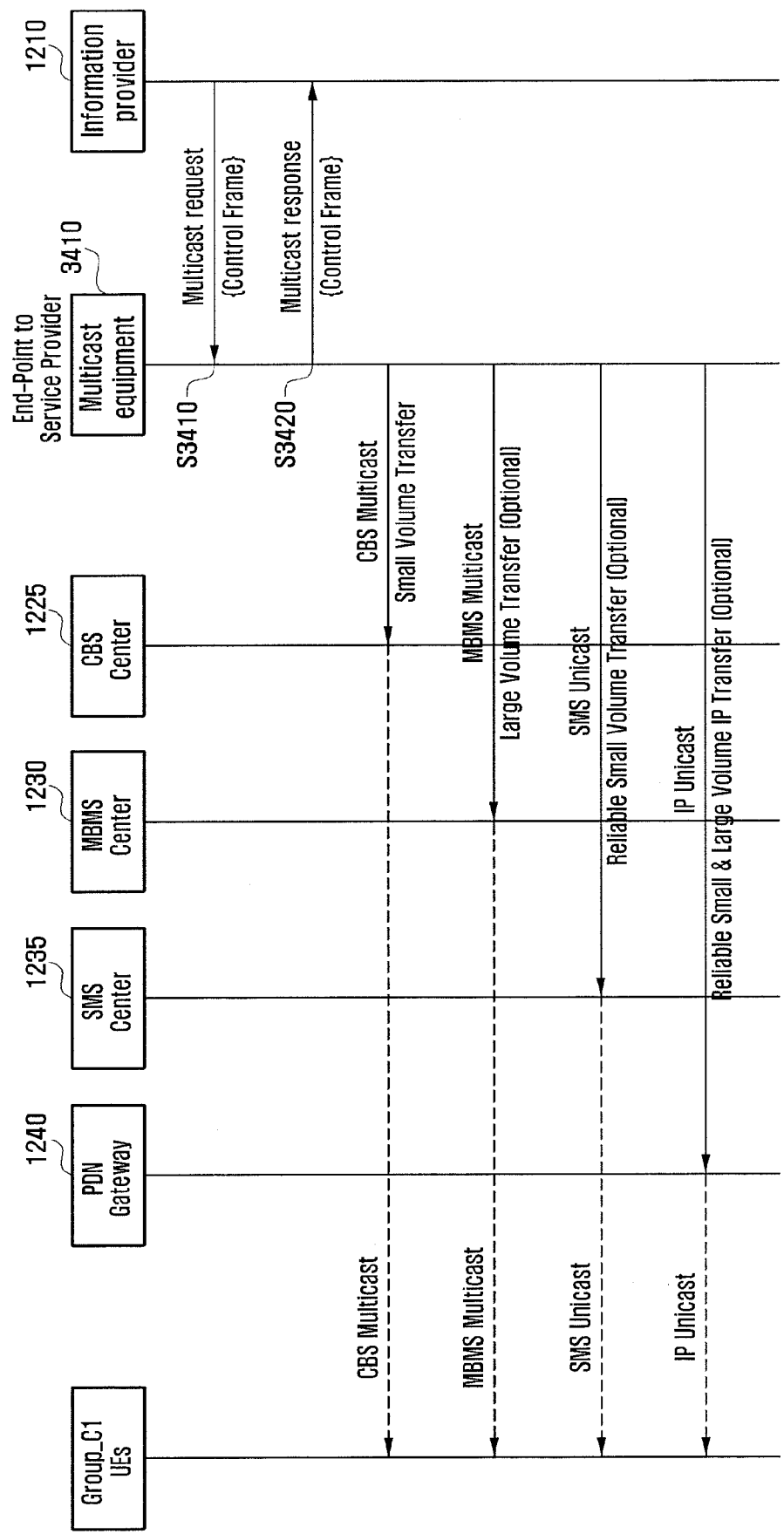
FIG. 34 is a signal flow diagram illustrating the group multicast procedure according to another embodiment of the present invention.

Another embodiment of the present invention is described hereinafter. The embodiment to be described hereinafter differs from that of FIG. 18 in that the information provider 1210 is aware of the existence of the multicast equipment 1220 as shown in FIG. 34. Accordingly, the information provider 1210 requests the multicast equipment 1220 for multicast information to be transmitted to a group, and the multicast equipment 1220 sends the information provider a response.

In the aforementioned another embodiment of the present invention, the multicast equipment 1220 is capable of using the radio resource efficiently without direct involvement in the multicast transmission. It is also possible to guarantee the information transmission reliability and particularly improve the accuracy of the information for the small size message in the CBS multicast transmission.

A description is made of the operation procedure according to another embodiment of the present invention with reference to FIG. 34.

The information provider 1210 sends the multicast equipment 3410 a multicast request message at step S3410. Then the multicast equipment 3410 sends the information provider 1210 a multicast response message at step S3420.

The procedure of selecting one of the CBS multicast and MBMS multicast depending on the size of the information and performing one of SMS unicast or IP unicast to the UEs listed in a separate retransmission list additionally is identical with that of FIG. 18.

FIG. 35 is a diagram illustrating the format of the multicast request message transmitted from the information provider 1210 to the multicast equipment 3410 in FIG. 34.

The multicast request message is an extended format of the above-described CBS Grouptransfer Request message and further includes Method Type information as a control code notifying of the usage of the message in addition to the content to be transmitted. The method type is identical with the function name indicating the operation for the information provider 120 to request the UE and partially defined in FIG. 39. FIG. 39 is a diagram illustrating an exemplary method type. As shown in FIG. 39, the method type may define the function of Dynamic Programming for measuring the electricity utilization dynamically, Bill Report Request for billing electricity utilization, Status Report Request for checking the status of the smart metering device, and firmware Fusing for update of the firmware of the smart metering device in the case of the mobile communication terminal such as smart metering device.

The multicast request message further includes a Method Parameter in addition to the method type. The method parameter field contains the supplementary information necessary for performing a particular function.

FIG. 36 is a diagram illustrating a format of the multicast response message of FIG. 34.

As shown in FIG. 36, the multicast response message is identical with that of the CBS Grouptransfer Response message with the exception of the name of the message.

Figure 40:
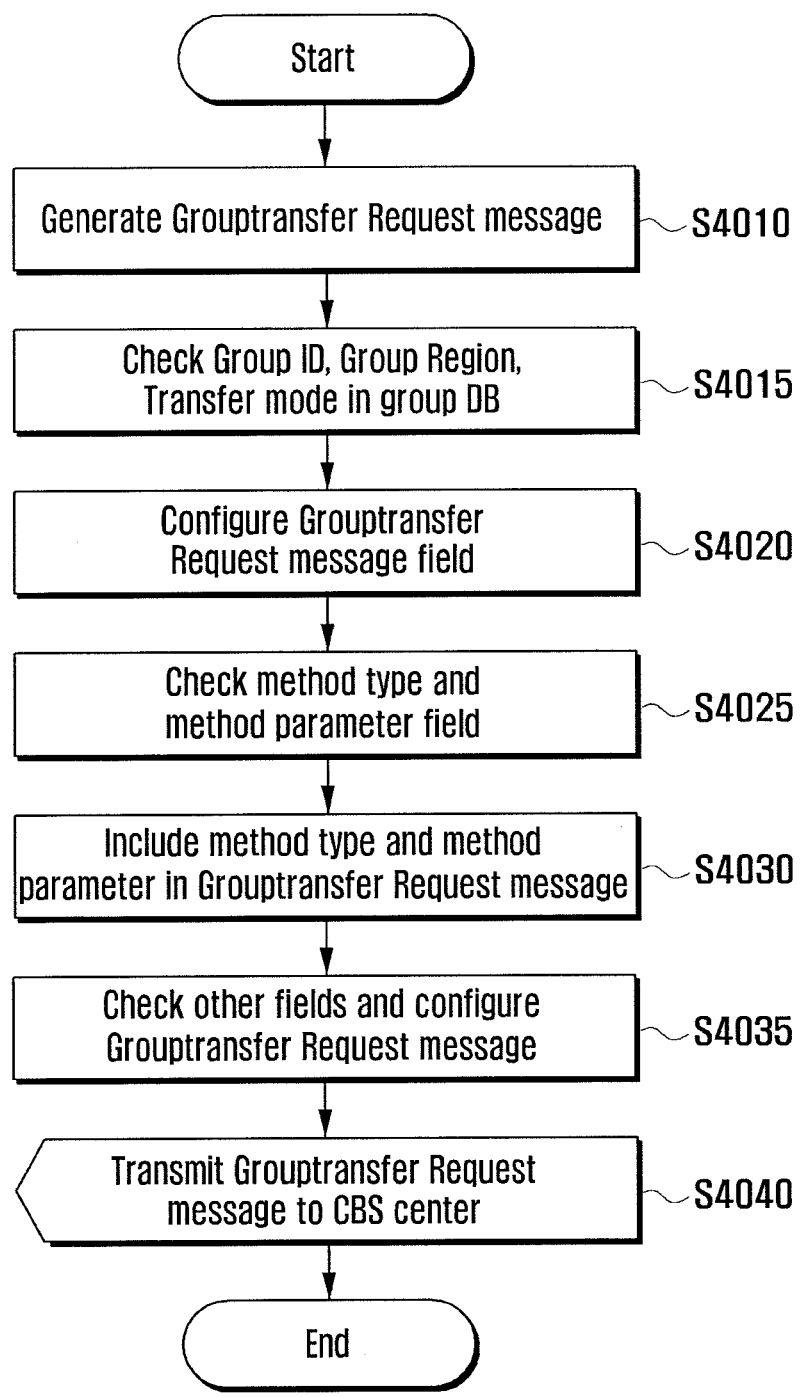
FIG. 40 is a flowchart illustrating the operation procedure of the multicast equipment 3410 received the multicast request message in FIG. 34.

FIG. 40 is a flowchart illustrating operation procedure of the multicast equipment 3410 received the multicast message in FIG. 34.

If the multicast request message is received, the multicast equipment 3410 generates a Grouptransfer Request message at step S4010. The multicast equipment 3410 extracts the Group ID, Group Region, and Transfer Mode from the CBS group database at step S4015 and includes the extracted information in the Grouptransfer Request message at step S1020. The multicast equipment 3410 checks the Method Type and Method Parameter at step S4025 and includes the checked information in the Grouptransfer Request message at step S4030.

If there is other necessary field, the multicast equipment 3410 includes the other field in the Grouptransfer Request message at step S4035 and sends the Grouptransfer Request message to the CBC 1225 at step S4040.

The procedure is identical with the message exchange procedure of FIG. 20 with the exception of the exchange of the multicast request and multicast response. Also, the CBS Grouptransfer Request and Response messages exchanged between the multicast equipment 3410 and the CBC 1225 have the formats modified as shown in FIGS. 41 and 42.

The CBS Grouptransfer Request message of FIG. 41 further includes the Method Type and Method Parameters fields as compared to the legacy message. The CBS Grouptransfer Response message has a format identical with the legacy message.

In another embodiment of the present invention, the Write-Replace Grouptransfer Request message transmitted by the CBC 1225 in FIG. 20 is modified. The modified Write-Replace Grouptransfer request message format is depicted in FIG. 37.

Although it is assumed that the Write-Replace Grouptransfer Request message transmitted by the CBC 1225 is not modified as shown in FIG. 37, the format of the Message Identifier is modified as shown in FIG. 38. Unlike FIG. 25 in which a field is for notifying that the corresponding transmission is Grouptransfer is added, an identifier of the group for receiving the corresponding CBS message is included explicitly in FIG. 38. Under the current assumption, the range of 40960~45055 is sued for group identifier but 40960 is designated for Group_C2.

In the case of receiving the message of FIG. 37, if the mobile communication terminal belongs to Group_C2, the terminal is capable of receiving the corresponding CBS message by checking the Message Identifier. Unlike the above-described method transmitting only the content, the purpose of the message is described in the header of the corresponding message in another embodiment of the present invention.

That is, the Grouptransfer Type code is used as the group identifier in FIG. 26. In another embodiment of the present invention, however, the Grouptransfer Type is used as a working code of which the information provider 1210 notifies the UEs. Accordingly, if the corresponding CBS message is received, the UEs belonging to the Group_C2 checks the Grouptransfer Type field and to take an appropriate action according to the field value and, if necessary, UEs the value of the Grouptransfer Message Contents of the corresponding message as an input parameter.

Figure 46:
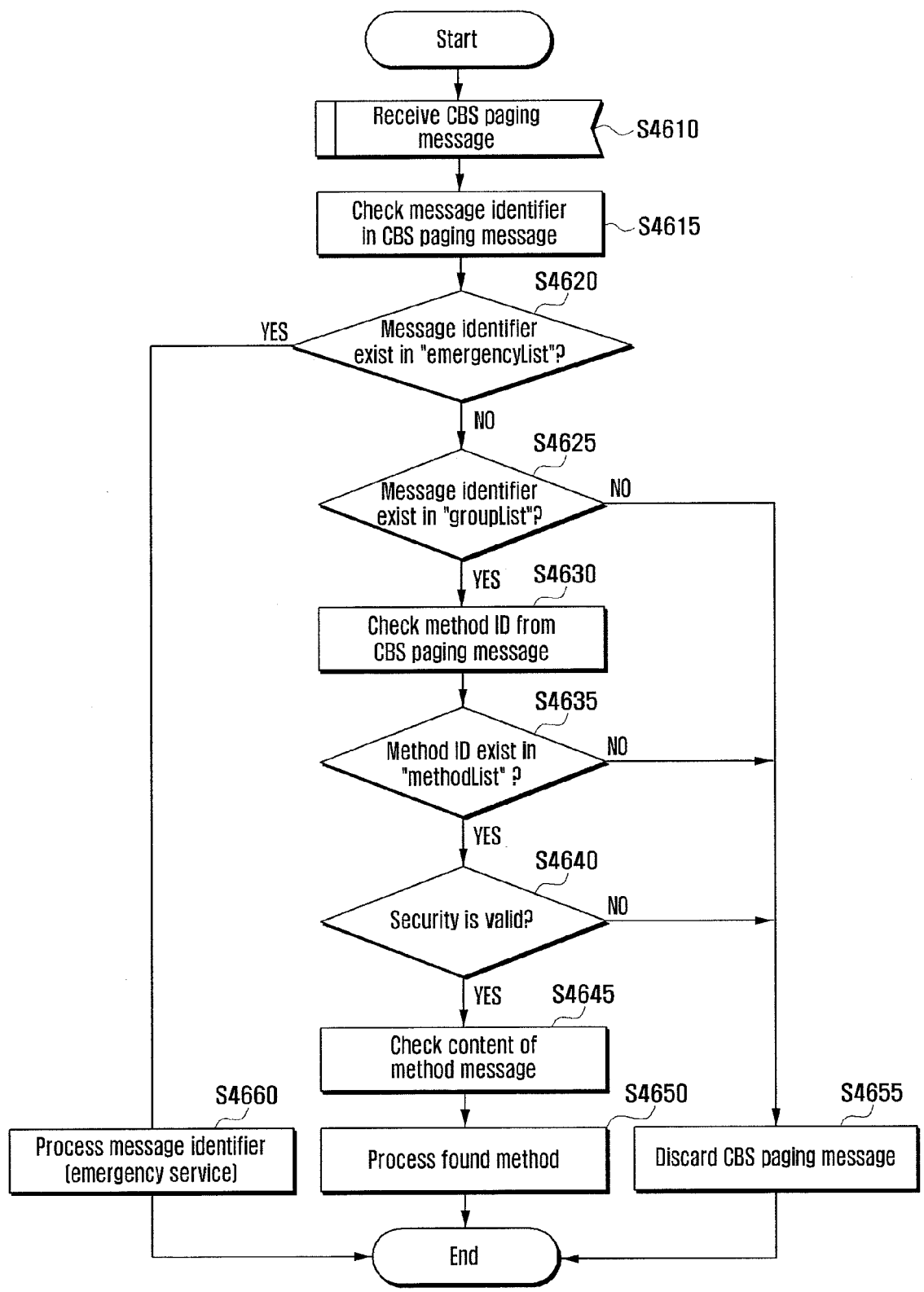
FIG. 46 is a flowchart illustrating the operation procedure of the UE according to another embodiment of the present invention.

FIG. 46 is a flowchart illustrating the operation procedure of the UE which has received the multicast message including a request function of the information provider 1210 through the mobile communication network according to another embodiment of the present invention.

Prior to the explanation of FIG. 46, it is assumed that the UE has an Emergency List as shown in FIG. 43 according to an embodiment of the present invention. This corresponds to the Message Identifier of the received message and summarizes the codes of emergency situation information as the original purpose of CBS in correspondence to FIG. 27. In FIG. 43, only the emergency information is shown without group multicast information.

Meanwhile, the information on the group to which the corresponding UE belongs is stored in each UE in the format of FIG. 44 as the identity information indicating the message for each group. Each UE is aware of the group to which it belongs based on the corresponding information.

The UE's Grouptransfer Method List depicted in FIG. 45 corresponds to FIG. 26 and denotes the operations to be taken by the UE which has received the CBS multicast transmission in another embodiment of the present invention.

Under this assumption, a description is made of the operation procedure of the UE with reference to FIG. 46.

First, the UE receives a CBS paging message at step S4610 and extracts a Message Identifier from the received CBS paging message at step S4615. Next, the UE checks the emergency list as shown in FIG. 43 to determine whether the extracted message identifier corresponds to the emergency information for which the UE has to take an action at step S4620. If the message identifier exists in the emergency list, the UE performs a process appropriate for the message identifier (emergency service) at step S4660.

Otherwise if the message identifier does not exist in the emergency list, the UE checks the group list as shown in FIG. 44 to determine whether the extracted message identifier exists in the group list at step S4625. If the message identifier exists in the group list, the UE extracts the method ID from the CBS paging message at step S4630 and determines whether the method ID exists in the method list at step S4635.

If the method ID exist in the method list, the UE checks the security code to determine whether it is valid request at step S4640 and, if valid, checks the content of the method message at step S4645. Next, the UE performs a procedure corresponding to the method content at step 4650. In more detail, the UE extracts the Grouptransfer Type as shown in FIG. 39 and compares it with the method list (Grouptransfer method List) to check the operation requested by the information provider 1210 and performs the corresponding operation. In this case, if the multicast group identifier or security code is invalid, the corresponding message is not processed.

Although the description is directed to the case where the present invention is implemented with independent multicast equipment 1220 as described with reference to FIG. 12, the present invention can be implemented by way of add a function block to the legacy PDN Gateway. A network structure according to another embodiment is depicted in FIG. 47.

Figure 47:
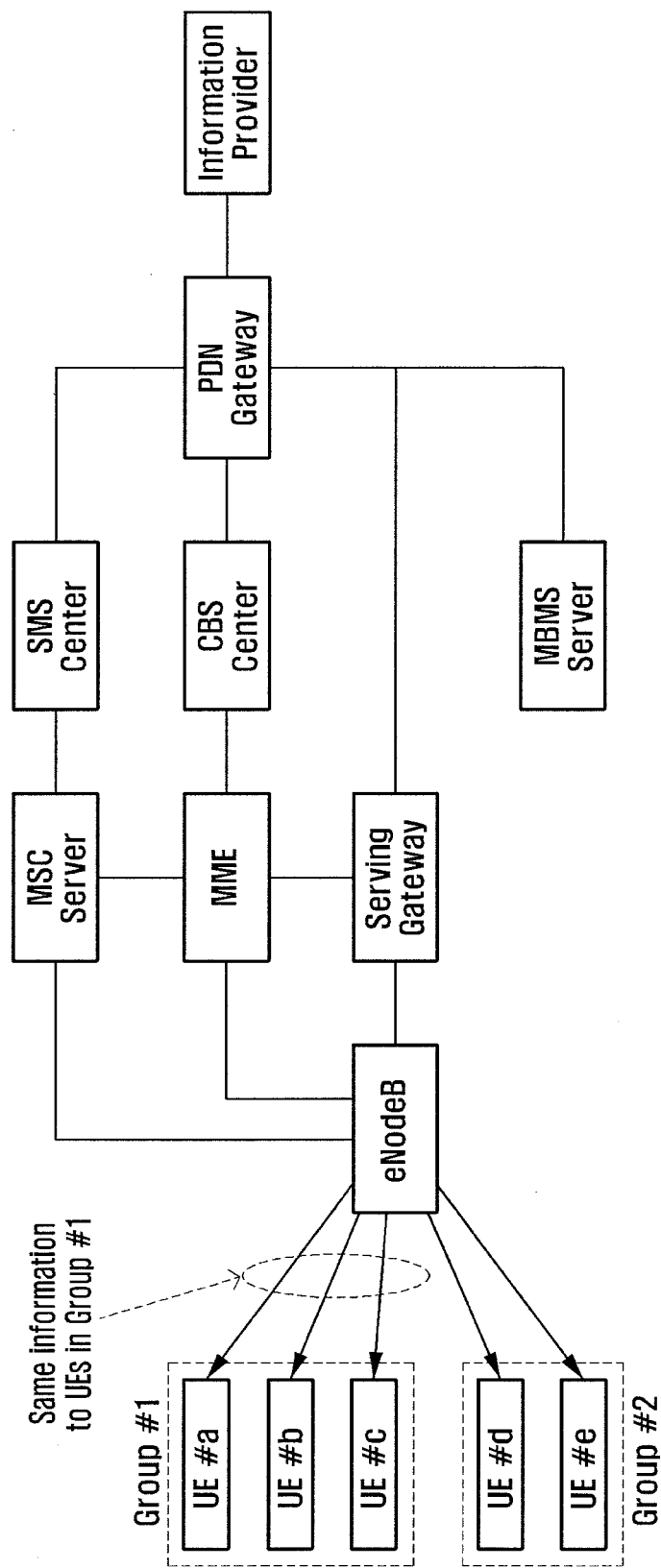
FIG. 47 is a block diagram illustrating the network structure according to another embodiment of the present invention.

For the embodiments of FIGS. 34 and 47, the message transmission procedure on the actual radio link in FIGS. 29 to 33 and the interface with MME/HSS for the procedure and operation procedure with the multicast equipment 1220 are applied identically.

The specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method for a multicast equipment to transmit information to a group of terminals in a mobile communication system, the method comprising:
   receiving information from an information provider;
   identifying a size of the received information;
   selecting a multicast mode from a cell broadcast service (CBS) multicast mode using a circuit-switching network and a multimedia broadcast multicast service (MBMS) multicast mode using a packet switching network based on the identified size of the received information;
   transmitting, if the MBMS multicast mode is selected, scheduling information of the information to a group of the terminals in the CBS multicast mode; and
   transmitting, to an MBMS server, a request for multicasting the information to the group of the terminals in the MBMS multicast mode.

2. The method of claim 1, further comprising:
   determining, after multicasting the information, whether a retransmission target terminal exists; and
   unicasting, if the retransmission target terminal exists, the information to the retransmission target terminal.

3. The method of claim 2, wherein determining comprises selecting the terminal in connected state, if the information is multicast, as the retransmission target terminal.

4. The method of claim 2, wherein determining comprises:
   determining, after multicasting the information, whether a retransmission target terminal list exists; and
   selecting, if the retransmission target terminal list exists, the terminal included in the list as the retransmission target terminal.

5. The method of claim 1, wherein selecting comprises:
   selecting, if the identified size of the received information is equal to or less than a predetermined threshold, the CBS multicast mode for transmission of the information; and
   selecting, if the identified size of the received information is greater than the threshold, the MBMS multicast mode for transmission of the information.

6. The method of claim 1, wherein multicasting comprises:
   negotiating, if the MBMS multicast mode is selected, the scheduling information for the MBMS multicast of the information;
   transmitting the negotiated scheduling information to the group of terminals in the CBS multicast mode; and
   transmitting the information to the group of terminal in the MBMS multicast mode at a time indicated in the scheduling information.

7. The method of claim 1, wherein the information received from the information provider is an IP packet including at least one of unicast IP address or multicast IP address.

8. A multicast apparatus for transmitting information to a group of terminals in a mobile communication system, the apparatus comprising:
   an transceiver configured to transmit and receive a signal; and
   a controller configured to:
      receive information from an information provider,
      identify a size of the received information,
      select a multicast mode from a cell broadcast service (CBS) multicast mode using a circuit-switching network and a multimedia broadcast multicast service (MBMS) multicast mode using a packet switching network based on the identified size of the received information,
      transmit, if the MBMS multicast mode is selected, scheduling information of the information to a group of the terminals in the CBS multicast mode, and
      transmit, to an MBMS server, a request for multicasting the information to the group of the terminals in the MBMS multicast mode.

9. The apparatus of claim 8, wherein the controller is further configured to determine, after multicasting the information, whether a retransmission target terminal exists and unicasts, if a retransmission target terminal exists, the information to the retransmission target terminal.

10. The apparatus of claim 9, wherein the controller is further configured to select the terminal in connected state, if the information is multicast, as the retransmission target terminal.

11. The apparatus of claim 9, wherein the controller is further configured to:
    determine, after multicasting the information, whether a retransmission target terminal list exists, and
    select, if the retransmission target terminal list exists, the terminal included in the list as the retransmission target terminal.

12. The apparatus of claim 8, wherein the controller is further configured to:
    select, if the identified size of the received information is equal to or less than a predetermined threshold, the CBS multicast mode for transmission of the information and
    select, if the identified size of the received information is greater than the threshold, the MBMS multicast mode for transmission of the information.

13. The apparatus of claim 8, wherein the controller is further configured to:
    negotiate, if the MBMS multicast mode is selected, the scheduling information for the MBMS multicast of the information,
    transmit the negotiated scheduling information to the group of terminals in the CBS multicast mode, and
    transmit the information to the group of terminal in the MBMS multicast mode at a time indicated in the scheduling information.

14. The apparatus of claim 8, wherein the information received from the information provider is an IP packet including at least one of unicast IP address or multicast IP address.

15. The apparatus of claim 8, further comprising a group database configured to store databases necessary for transmitting the information to the group of terminals,
    wherein the group database includes at least one of group IP address allocated to the information provider, CBS group identifier for identifying a CBS multicast group in the CBS multicast mode, MBMS group identifier for identifying a MBMS multicast group in the MBMS multicast mode, and terminal identifier for identifying a terminal in a unicast mode.

16. The apparatus of claim 15, wherein the CBS group identifier includes at least one of Group Region as a target identified by the CBS group identifier (CBS Group ID), transfer mode, and terminal identifier for identifying the terminal in the group.

17. The method of claim 1, further comprising identifying, before selecting the multicast mode from the CBS multicast mode and the MBMS multicast mode, a group of terminals based on an internet protocol (IP) address configured to the information,
    wherein the multicasting of the information includes multicasting the information to the identified group of terminals in the selected multicast mode.

18. The apparatus of claim 8, wherein the controller is further configured to identify, before selecting the multicast mode from the CBS multicast mode and the MBMS multicast mode, a group of terminals based on an internet protocol (IP) address configured to the information, and
    wherein the multicasting of the information includes multicasting the information to the identified group of terminals in the selected multicast mode.

* * * * *